US011861127B2

(12) United States Patent
Bang et al.

(10) Patent No.: US 11,861,127 B2
(45) Date of Patent: Jan. 2, 2024

(54) ELECTRONIC DEVICE

(71) Applicant: Samsung Display Co., Ltd., Yongin-si (KR)

(72) Inventors: Gyeongnam Bang, Seoul (KR); Yeri Jeong, Suwon-si (KR); Eunyoung Kim, Asan-si (KR); Jeongyun Han, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/097,123

(22) Filed: Jan. 13, 2023

(65) Prior Publication Data

US 2023/0259240 A1 Aug. 17, 2023

(30) Foreign Application Priority Data

Feb. 17, 2022 (KR) .......................... 10-2022-0020827

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 2203/04111* (2013.01)

(58) Field of Classification Search
CPC ................ G06F 3/0446; G06F 3/0412; G06F 2203/04111
See application file for complete search history.

(56) References Cited

U.S. PATENT DOCUMENTS

| 9,569,031 | B2 | 2/2017 | Han et al. | |
| 9,778,801 | B2* | 10/2017 | Jung | G06F 3/0443 |
| 10,203,818 | B2* | 2/2019 | Jeon | G06F 3/0448 |
| 10,514,800 | B2* | 12/2019 | Jo | G06F 3/0412 |
| 10,761,665 | B2* | 9/2020 | Park | G06F 3/044 |
| 10,908,754 | B2* | 2/2021 | Bang | G06F 3/0446 |
| 10,955,964 | B2 | 3/2021 | Jung et al. | |
| 11,061,504 | B2* | 7/2021 | Cho | G06F 3/0446 |
| 11,537,232 | B2* | 12/2022 | Choi | G06F 3/04164 |

(Continued)

FOREIGN PATENT DOCUMENTS

| KR | 10-1385438 B1 | 4/2014 |
| KR | 10-2017-0060833 A | 6/2017 |

(Continued)

*Primary Examiner* — Ibrahim A Khan
(74) *Attorney, Agent, or Firm* — Lewis Roca Rothgerber Christie LLP

(57) ABSTRACT

An electronic device includes: an input sensor including a plurality of unit sensors each having a first unit sensor, a second unit sensor, and a third unit sensor adjacent, wherein each of the first, second, and third unit sensors includes: a first sensing electrode extending in the first direction; a second sensing electrode extending in the second direction; and a first dummy electrode between the first sensing electrode and the second sensing electrode, wherein the first sensing electrode of the first unit sensor is connected to a first adjacent dummy electrode of the first dummy electrodes of the third unit sensor adjacent to the first unit sensor, and wherein the second sensing electrode of the first unit sensor is connected to a first adjacent dummy electrode of the first dummy electrodes of the second unit sensor adjacent to the first unit sensor.

20 Claims, 16 Drawing Sheets

(56) References Cited

U.S. PATENT DOCUMENTS

| | | | |
|---|---|---|---|
| 11,681,389 B2* | 6/2023 | Kim ...................... | G06F 3/0446 |
| | | | 345/173 |
| 2020/0241701 A1* | 7/2020 | Nakayama ............ | G06F 3/0446 |
| 2020/0285348 A1* | 9/2020 | Nakayama .............. | G06F 3/047 |
| 2020/0395420 A1* | 12/2020 | Bok ........................ | G01L 1/205 |
| 2021/0405845 A1 | 12/2021 | Bang et al. | |
| 2022/0107707 A1* | 4/2022 | Bang ..................... | G06F 3/0445 |
| 2022/0300118 A1* | 9/2022 | Bo ....................... | G06F 3/04164 |
| 2023/0015331 A1* | 1/2023 | Miyasaka ............. | G06F 3/0445 |
| 2023/0168771 A1* | 6/2023 | Kim ...................... | G06F 3/0418 |
| | | | 345/174 |

FOREIGN PATENT DOCUMENTS

| KR | 10-2020-0077344 A | 6/2020 |
|---|---|---|
| KR | 10-2020-0142611 A | 12/2020 |

\* cited by examiner

ELECTRONIC DEVICE

CROSS-REFERENCE TO RELATED APPLICATION

The present application claims priority to and the benefit of Korean Patent Application No. 10-2022-0020827, filed on Feb. 17, 2022, the entire content of which is hereby incorporated by reference.

BACKGROUND

Aspects of some embodiments of the present disclosure herein relate to an electronic device.

An electronic device may sense external input applied from the outside of the electronic device. The external input may be a user's input. The user's input may include various types of external input such as a portion of a user's body (e.g., a finger), light, heat, a pen, or pressure. The electronic device may recognize the coordinates of a pen using an electromagnetic resonance (EMR) method or may recognize the coordinates of a pen using an active electrostatic (AES) method.

The above information disclosed in this Background section is only for enhancement of understanding of the background and therefore the information discussed in this Background section does not necessarily constitute prior art.

SUMMARY

Aspects of some embodiments of the present disclosure herein relate to an electronic device, for example, to an electronic device having improved sensing reliability.

Aspects of some embodiments of the present disclosure include an electronic device having relatively improved sensing reliability.

Aspects of some embodiments of the present disclosure may also include an electronic device having relatively improved pen sensing reliability by extending a sensing electrode of a unit sensor to an adjacent unit sensor.

According to some embodiments of the present disclosure, an electronic device includes: a display panel; and an input sensor on the display panel and including a plurality of unit sensors each having a first unit sensor, a second unit sensor adjacent to the first unit sensor in a first direction, and a third unit sensor adjacent to the first unit sensor in a second direction crossing the first direction, wherein each of the first, second, and third unit sensors includes a first sensing electrode extending in the first direction; a second sensing electrode extending in the second direction; and a first dummy electrode between the first sensing electrode and the second sensing electrode, and the first sensing electrode of the first unit sensor is connected to a first adjacent dummy electrode of the first dummy electrodes of the third unit sensor adjacent to the first unit sensor, and the second sensing electrode of the first unit sensor is connected to a first adjacent dummy electrode of the first dummy electrodes of the second unit sensor adjacent to the first unit sensors.

According to some embodiments, the first sensing electrode may include a first sensing unit and a first connection unit, the second sensing electrode may include a second sensing unit and a second connection unit, the first connection unit connects first sensing units adjacent thereto to each other, and the second connection unit may connect second sensing units adjacent thereto to each other.

According to some embodiments, the first sensing unit, the second sensing unit, and the first connection unit may be on the same layer, and the second connection unit may include a first bridge pattern and may be on a layer different from a layer on which the first sensing unit, the second sensing unit, and the first connection unit are located.

According to some embodiments, each of the first sensing electrode and the second sensing electrode and the first adjacent dummy electrode may be connected through a second bridge pattern, and the second bridge pattern and the first bridge pattern may be on the same layer.

According to some embodiments, an opening may be defined in each of the first sensing unit and the second sensing unit, and each of the plurality of unit sensors further comprises a second dummy electrode in the opening and floating.

According to some embodiments, the first sensing electrode of the first unit sensor may be connected to a second adjacent dummy electrode of the second dummy electrodes of the third unit sensor adjacent to the first unit sensor, and the second sensing electrode of the first unit sensor may be connected to a second adjacent dummy electrode of the second dummy electrodes of the second unit sensor adjacent to the first unit sensor.

According to some embodiments, the second adjacent dummy electrode may be connected to the first adjacent dummy electrode, and the first sensing electrode and the second sensing electrode may be electrically connected to the second adjacent dummy electrode through the first adjacent dummy electrode.

According to some embodiments, the first adjacent dummy electrode and the second adjacent dummy electrode may be connected through a third bridge pattern, and the third bridge pattern may be on a layer same as a layer on which the first bridge pattern and the second bridge pattern are located.

According to some embodiments, the first sensing electrode may include a first connection pattern to which the second bridge pattern is directly connected, and the second sensing electrode may include a second connection pattern to which the second bridge pattern is directly connected.

According to some embodiments, the electronic device may further include an encapsulation layer on the display panel, wherein the input sensor may be directly on the encapsulation layer.

According to some embodiments, the input sensor may include an active region and a peripheral region adjacent to the active region, the active region includes a plurality of unit sensor regions, and the plurality of unit sensors are in the plurality of unit sensor regions.

According to some embodiments, the plurality of unit sensor regions may include a first unit sensor region in which the first unit sensor is located, a second unit sensor region in which the second unit sensor is located, and a third unit sensor region in which the third unit sensor is located.

According to some embodiments, the plurality of unit sensor regions may further include a first region in which a portion of the first unit sensor and a portion of the second unit sensor are located and a second region in which a portion of the first unit sensor and a portion of the third unit sensor are located.

According to some embodiments of the present disclosure, an electronic device includes: a display panel; and an input sensor on the display panel and including a plurality of unit sensors, wherein each of the plurality of unit sensors includes a first sensing electrode extending in a first direction; a second sensing electrode extending in a second direction crossing the first direction; a first additional sensing electrode electrically connected to the first sensing electrode; and a second additional sensing electrode electrically connected to the second sensing electrode, the first sensing electrode and the second sensing electrode are in the first unit sensor region, the second additional sensing electrode is in the first unit sensor region and in a second unit sensor region adjacent to the first unit sensor region in the first direction, and the first additional sensing electrode is in the first unit sensor region and in a third unit sensor region adjacent to the first unit sensor region in the second direction.

According to some embodiments, each of the plurality of unit sensors may further include a first bridge pattern, and the first bridge pattern may connect the first sensing electrode and the first additional sensing electrode, and may connect the second sensing electrode and the second additional sensing electrode.

According to some embodiments, the first bridge pattern may be on a layer different from a layer on which the first sensing electrode, the first additional sensing electrode, the second sensing electrode, and the second additional sensing electrode are located.

According to some embodiments, one of the first sensing electrode and the second sensing electrode may include a second bridge pattern, and the first bridge pattern and the second bridge pattern may be on the same layer.

According to some embodiments, the plurality of unit sensors may include a first unit sensor in the first unit sensor region, a second unit sensor in the second unit sensor region, and a third unit sensor in the third unit sensor region.

According to some embodiments, in the first unit sensor region, a first region overlapping the second unit sensor region and a second region overlapping the third unit sensor region may be defined, the second additional electrode of the first unit sensor and a second additional electrode of the second unit sensor may be in the first region, and the first additional electrode of the first unit sensor and a first additional electrode of the third unit sensor may be in the second region.

According to some embodiments, each of the plurality of unit sensors may include a plurality of openings defined in each of the first sensing electrode and the second sensing electrode, and the first additional sensing electrode and the second additional sensing electrode of another unit sensor adjacent thereto may be in some of the openings.

BRIEF DESCRIPTION OF THE FIGURES

The accompanying drawings are included to provide a further understanding of embodiments according to the present disclosure, and are incorporated in and constitute a part of this specification. The drawings illustrate aspects of some embodiments of the present disclosure and, together with the description, serve to explain characteristics of some embodiments of the present disclosure. In the drawings.

DETAILED DESCRIPTION

Figure 1:
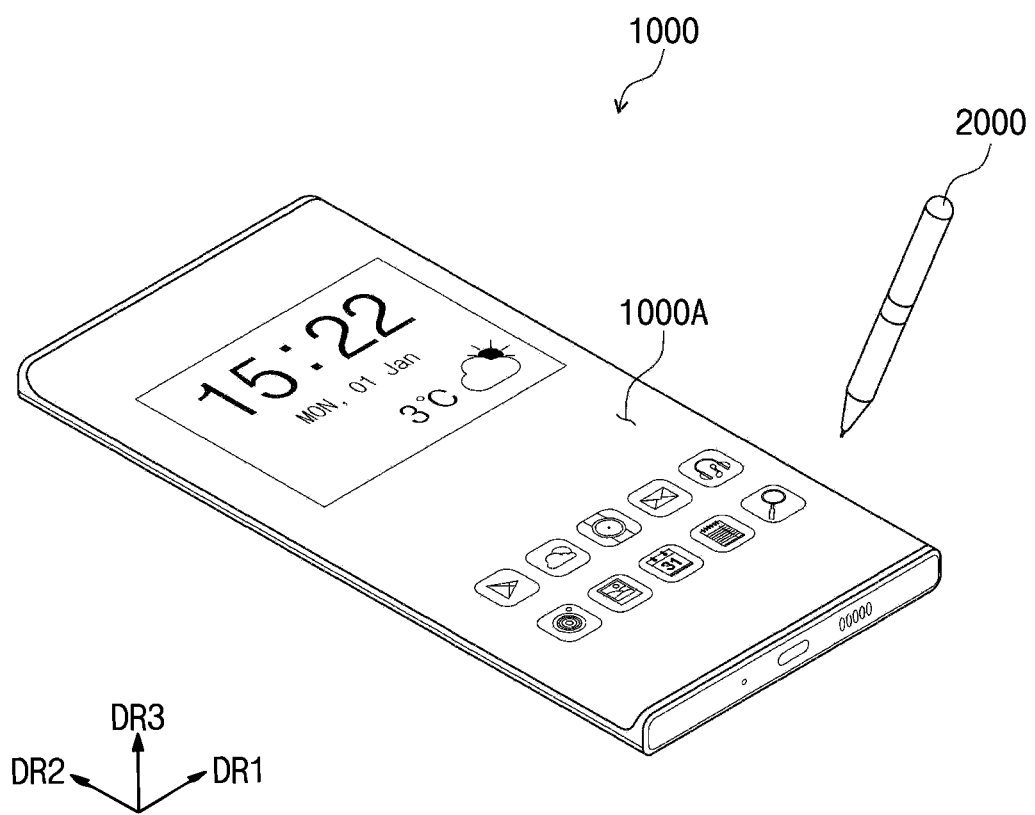
FIG. 1 is a perspective view of an electronic device according to some embodiments of the present disclosure.

In this specification, when an element (or a region, a layer, a portion, or the like) is referred to as "being on", "being connected to", or "being coupled to" another element, it may be directly located/connected/coupled to another element, or an intervening third element may also be located therebetween.

Like numbers or symbols refer to like elements throughout. Also, in the drawings, the thicknesses, ratios, and dimensions of the elements are exaggerated for effective description of the technical contents. "And/or" includes one or more combinations which may be defined by the associated elements.

Although the terms first, second, etc. may be used to describe various elements, these elements should not be limited by these terms. These terms are only used to distinguish one element from another element. For example, a first element may be referred to as a second element, and similarly, a second element may also be referred to as a first element without departing from the scope of the present disclosure. The singular forms include the plural forms as well, unless the context clearly indicates otherwise.

Also, terms of "below", "on lower side", "above", "on upper side", or the like may be used to describe the relationships of the elements illustrated in the drawings. These terms have relative concepts and are described on the basis of the directions indicated in the drawings.

It will be understood that the term "includes" or "comprises", when used in this specification, specifies the presence of stated features, integers, steps, operations, elements, components, or a combination thereof, but does not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which the present disclosure belongs. Also, terms, such as those defined in commonly used dictionaries, should be interpreted as having a meaning that is consistent with their meaning in the context of the relevant art and should not be interpreted in an idealized or overly formal sense unless expressly so defined herein.

Hereinafter, aspects of some embodiments of the present disclosure will be described in more detail with reference to the drawings.

FIG. 1 is a perspective view of an electronic device according to some embodiments of the present disclosure;

Referring to FIG. 1, an electronic device 1000 may be a device activated in response to an electrical signal. For example, the electronic device 1000 may be a mobile phone, a tablet PC, a vehicle navigation unit, a game console, or a wearable apparatus, but embodiments of the present disclosure are not limited thereto. In FIG. 1, the electronic device 1000 is illustrated as a mobile phone, but embodiments according to the present disclosure are not limited thereto.

The electronic device 1000 may display images through an active region 1000A. The active region 1000A may include a plane defined by a first direction DR1 and a second direction DR2. A thickness direction of the electronic device 1000 may be parallel to a third direction DR3 that crosses the first direction DR1 and the second direction DR2. Thus, a front surface (or upper surface) and a rear surface (or lower surface) of each member constituting the electronic device 1000 may be defined based on the third direction DR3.

The electronic device 1000 may sense inputs applied from the outside of the electronic device 1000. The external inputs may be an input of a user. The input of the user may include various types of external inputs such as a portion of the user's body, light, heat, or pressure.

The electronic device 1000 illustrated in FIG. 1 may sense an input by a user's touch and an input by an input device 2000. The input device 2000 may refer to a device other than the user's body. For example, the input device 2000 may be an active pen, a stylus pen, a touch pen, or an electronic pen. Hereinafter, an example in which the input device 2000 is an active pen will be described.

The electronic device 1000 and the input device 2000 may be capable of bidirectional communication. The electronic device 1000 may provide an uplink signal to the input device 2000. For example, the uplink signal may include a synchronization signal or information of the electronic device 1000, but is not particularly limited thereto. The input device 2000 may provide a downlink signal to the electronic device 1000. The downlink signal may include a synchronization signal or status information of the input device 2000. For example, the downlink signal may include coordinate information of the input device 2000, battery information of the input device 2000, inclination information of the input device 2000, and/or various information stored in the input device 2000, and the like, but is not particularly limited thereto.

Figure 2:
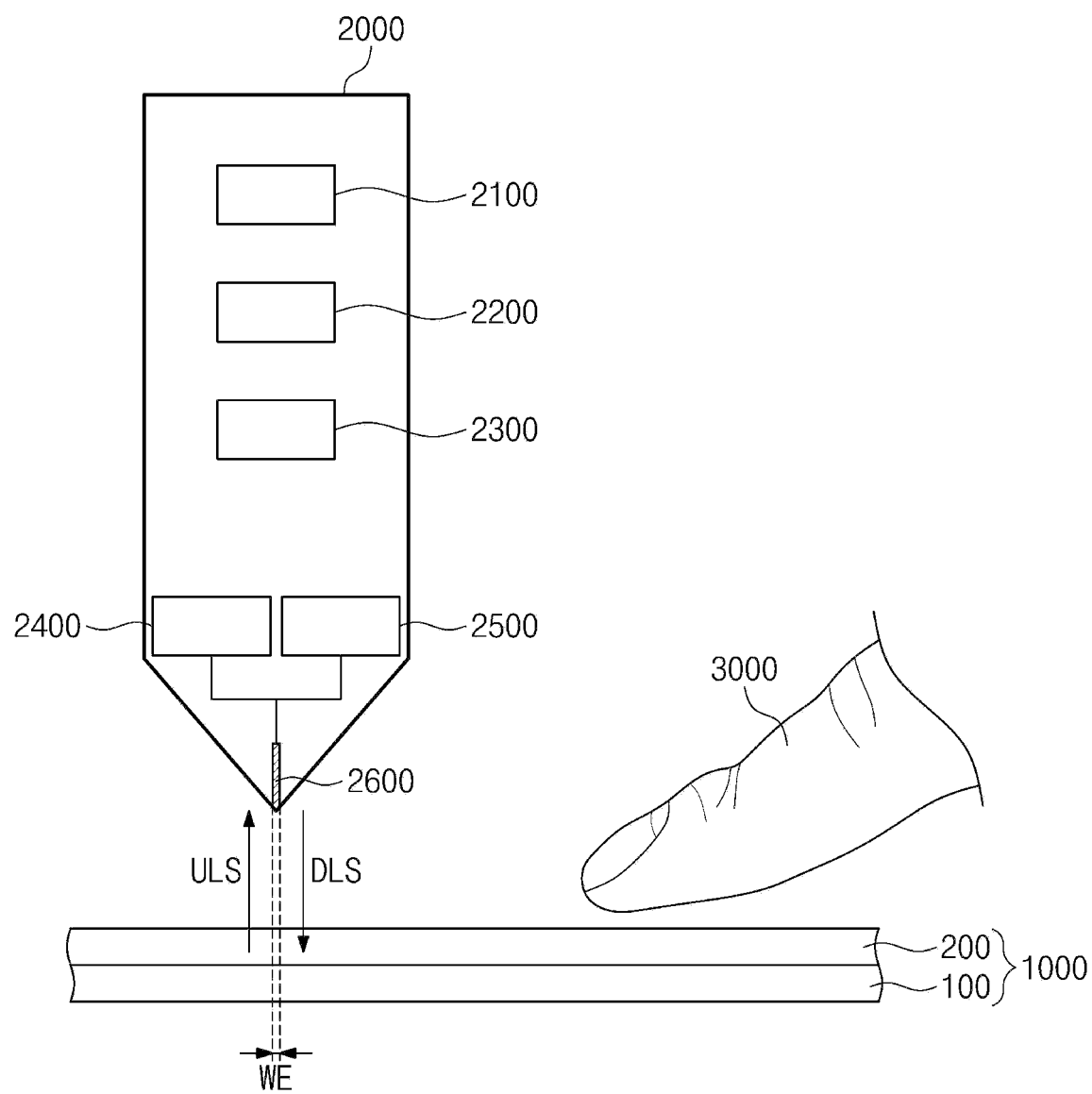
FIG. 2 is a block diagram schematically illustrating an electronic device and an input device according to some embodiments.

FIG. 2 is a block diagram of an electronic device and an input device according to some embodiments of the present disclosure.

Referring to FIG. 2, the electronic device 1000 may include a display panel 100 and an input sensor 200.

The display panel 100 may be configured to substantially generate an image. The display panel 100 may be a light-emitting display layer. For example, the display panel 100 may be an organic light-emitting display layer, a quantum dot display layer, a micro LED display layer, or a nano LED display layer.

The input sensor 200 may be located on the display panel 100. The input sensor 200 may sense an external input applied from the outside. The input sensor 200 may sense both an input by a user's body 3000 and an input by the input device 2000.

An input region of the user's body 3000 may have a first width WE1.

The input sensor 200 may be operated in a time-division driving manner. For example, the input sensor IS may be repeatedly driven alternately in a first mode and a second mode. The first mode may be a mode for sensing an input by the user's body 3000, and the second mode may be a mode for sensing an input by the input device 2000.

When the second mode starts, the input sensor 200 may provide an uplink signal ULS to the input device 2000. When the input device 2000 receives the uplink signal ULS and is synchronized with the electronic device 1000, the input device 2000 may provide a downlink signal DLS toward the input sensor 200.

The input device 2000 may include a power source 2100, a memory 2200, a controller 2300, a transmitter 2400, a receiver 2500, and a pen electrode 2600. However, components constituting the input device 2000 are not limited to the components listed above. For example, the input device 2000 may further include an electrode switch for switching the pen electrode 2600 to a signal transmission mode or a signal reception mode, a pressure sensor for sensing pressure, or a rotation sensor for sensing rotation, etc.

The input sensor 200 may acquire coordinates of the input device 2000 through the pen electrode 2600, and the input sensor 200 may acquire an inclination of the input device 2000 through the pen electrode 2600.

An input region of the pen electrode 2600 may have a second width WE2. The second width WE2 of the input region of the pen electrode 2600 may be smaller than the first width WE1 of the input region of the user's body 3000.

The power source 2100 may include a high-capacity capacitor or a battery for supplying power to the input device 2000. The memory 2200 may store function information of the input device 2000. The controller 2300 may control the operation of the input device 2000. Each of the transmitter 2400 and the receiver 2500 may communicate with the electronic device 1000 through the pen electrode 2600. The transmitter 2400 may be referred to as a signal generator or a transmitting circuit, and the receiver 2500 may be referred to as a signal receiver or a receiving circuit.

Figure 3:
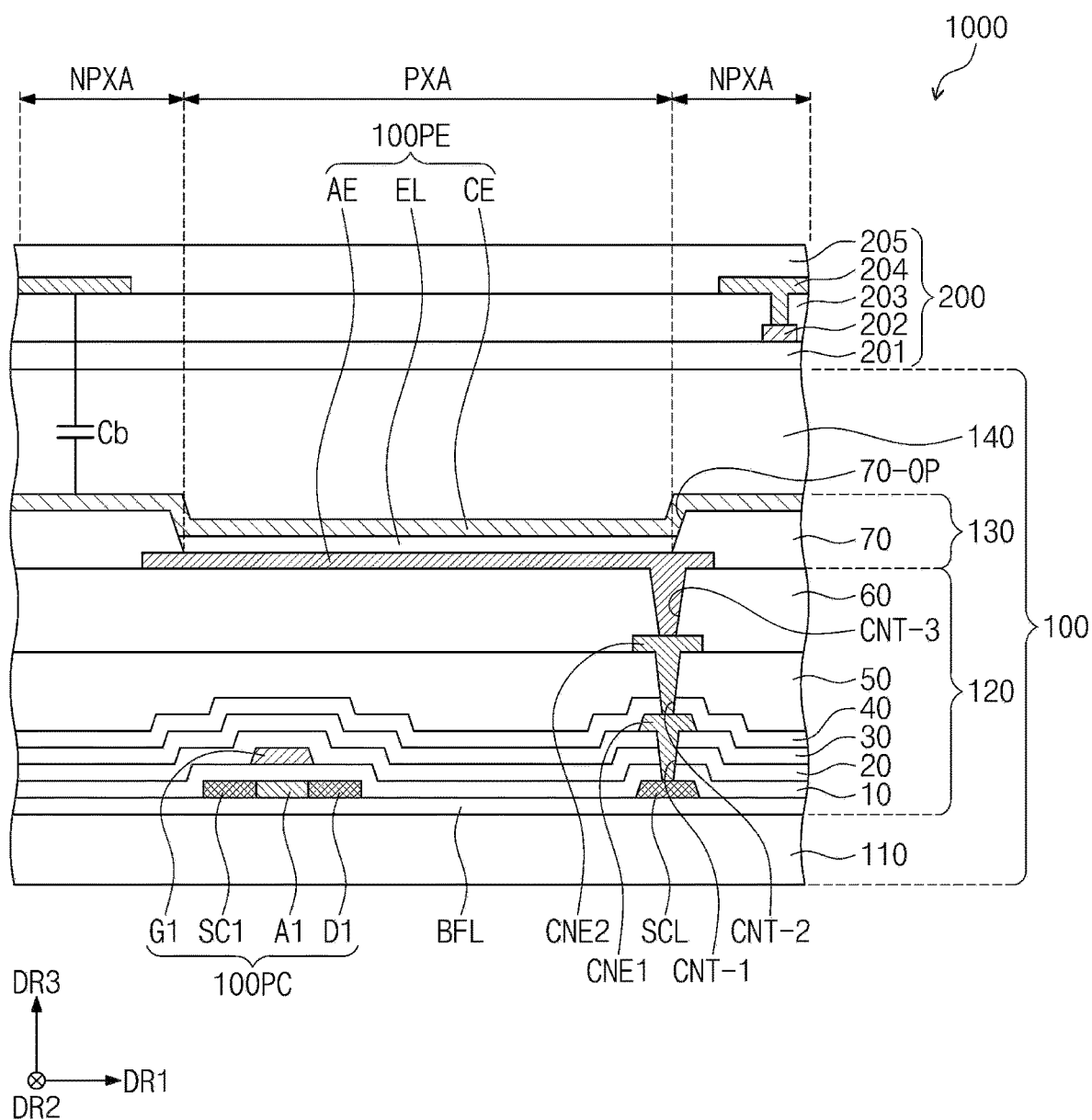
FIG. 3 is a cross-sectional view of an electronic device according to some embodiments.

FIG. 3 is a cross-sectional view of an electronic device according to some embodiments of the present disclosure.

Referring to FIG. 3, the display panel 100 may include a base layer 110, a circuit layer 120, a light-emitting element layer 130, and an encapsulation layer 140.

The base layer 110 may be a member that provides a base surface on which the circuit layer 120 is located. The base layer 110 may be a glass substrate, a metal substrate, or a polymer substrate. However, embodiments of the present disclosure are not limited thereto, and the base layer 110 may be an inorganic layer, an organic layer, or a composite material layer.

The base layer 110 may have a multi-layer structure. For example, the base layer 110 may include a first synthetic resin layer, a silicon oxide (SiOx) layer located on the first synthetic resin layer, an amorphous silicon (a-Si) layer located on the silicon oxide layer, and a second synthetic resin layer located on the amorphous silicon layer. The silicon oxide layer and the amorphous silicon layer may be referred to as a base barrier layer. Each of the first and second synthetic resin layers may include a polyimide-based resin. In addition, each of the first and second synthetic resin layers may include at least one of an acrylic resin, a methacrylic resin, a polyisoprene-based resin, a vinyl-based resin, an epoxy-based resin, a urethane-based resin, a cellulose-based resin, a siloxane-based resin, a polyamide-based resin, or a perylene-based resin. Meanwhile, in this specification, a "~based" resin may be considered as including a functional group of "~~".

The circuit layer 120 may be located on the base layer 110. The circuit layer 120 may include an insulating layer, a semiconductor pattern, a conductive pattern, a signal line, and the like. The insulating layer, the semiconductor layer, and the conductive layer are formed on the base layer 110 through coating, deposition or the like, and subsequently, the insulating layer, the semiconductor layer, and the conductive layer may be selectively patterned by performing a photolithography process multiple times. Then, the semiconductor pattern, the conductive pattern, and the signal line included in the circuit layer 120 may be formed.

At least one inorganic layer is formed on the upper surface of the base layer 110. The inorganic layer may include at least one of aluminum oxide, titanium oxide, silicon oxide, silicon oxynitride, zirconium oxide, or hafnium oxide. The inorganic layer may be formed as multiple layers. The multi-layered inorganic layers may constitute a barrier layer and/or a buffer layer. According to some embodiments, the display panel 100 is illustrated as including a buffer layer BFL.

The buffer layer BFL may enhance a bonding force between the base layer 110 and the semiconductor pattern. The buffer layer BFL may include a silicon oxide layer and a silicon nitride layer, and the silicon oxide layer and the silicon nitride layer may be alternately stacked.

The semiconductor pattern may be located on the buffer layer BFL. The semiconductor pattern may include polysilicon. However, embodiments of the present disclosure are not limited thereto, and the semiconductor pattern may include amorphous silicon or a metal oxide.

FIG. 3 illustrates only a portion of a semiconductor pattern, and a semiconductor pattern may be further located in another region. The semiconductor pattern may be arranged according to a specific rule over the pixels. The semiconductor pattern may have different electrical properties depending on whether the semiconductor pattern is doped or not. The semiconductor pattern may include a first region having high conductivity and a second region having low conductivity. The first region may be doped with an N-type dopant or a P-type dopant. A P-type transistor may include a doped region which is doped with the P-type dopant, and an N-type transistor may include a doped region which is doped with the N-type dopant. The second region may be an undoped region, or a region doped at a lower concentration than that of the first region.

The first region may have higher conductivity than the second region, and may serve as an electrode or a signal line substantially. The second region may substantially correspond to an active region (or channel) of the transistor. That is, a portion of the semiconductor pattern may be an active of the transistor, another portion may be a source or a drain of the transistor, and the other portion may be a connection electrode or a connection signal line.

Each of the pixels may have an equivalent circuit including seven transistors, one capacitor, and a light-emitting element, and an equivalent circuit diagram of the pixel may be modified in various forms. FIG. 3 illustrates one transistor 100PC and a light-emitting element 100PE included in the pixel, but embodiments according to the present disclosure are not limited thereto.

A source SC1, an active A1, and a drain D1 of the transistor 100PC may be formed from a semiconductor pattern. The source SC1 and the drain D1 may extend in opposite directions from the active A1 on a cross-section. A portion of a connection signal line SCL formed from the semiconductor pattern is illustrated in FIG. 3. According to some embodiments, the connection signal line SCL may be electrically connected to the drain D1 of the second transistor 100PC on a plane.

A first insulating layer 10 may be located on the buffer layer BFL. The first insulating layer 10 may overlap the plurality of pixels in common and cover the semiconductor pattern. The first insulating layer 10 may be an inorganic layer and/or an organic layer, and may have a single- or multi-layered structure. The first insulating layer 10 may include at least one of aluminum oxide, titanium oxide, silicon oxide, silicon nitride, silicon oxynitride, zirconium oxide, or hafnium oxide. According to some embodiments, the first insulating layer 10 may be a single-layered silicon oxide layer. An insulating layer of the circuit layer 120 to be described later as well as the first insulating layer 10 may be an inorganic layer and/or an organic layer, and may have a single-layer or multilayer structure. The inorganic layer may include at least one of the above-described materials, but embodiments according to the present disclosure are not limited thereto.

The gate G1 of the transistor 100PC is located on the first insulating layer 10. The gate G1 may be a portion of the metal pattern. The gate G1 overlaps the active A1. In the process of doping the semiconductor pattern, the gate G1 may function as a mask.

A second insulating layer 20 may be located on the first insulating layer 10 and may cover the gate G1. The second insulating layer 20 may overlap the pixels in common. The second insulating layer 20 may be an inorganic layer and/or an organic layer, and may have a single- or multi-layered structure. According to some embodiments, the second insulating layer 20 may be a single-layered silicon oxide layer.

A third insulating layer 30 may be located on the second insulating layer 20, and according to some embodiments, the third insulating layer 30 may be a single silicon oxide layer.

A first connection electrode CNE1 may be located on the third insulating layer 30. The first connection electrode CNE1 may be connected to the connection signal line SCL through a contact hole CNT-1 that passes through the first, second, and third insulating layers 10, 20, and 30.

A fourth insulating layer 40 may be located on the third insulating layer 30. The fourth insulating layer 40 may be a single-layered silicon oxide layer. A fifth insulating layer 50 may be located on the fourth insulating layer 40. The fifth insulating layer 50 may be an organic layer.

A second connection electrode CNE2 may be located on the fifth insulating layer 50. The second connection electrode CNE2 may be connected to the first connection electrode CNE1 through a contact hole CNT-2 that passes through the fourth insulating layer 40 and the fifth insulating layer 50.

A sixth insulating layer 60 may be located on the fifth insulating layer 50 and may cover the second connection electrode CNE2. The sixth insulating layer 60 may be an organic layer. The light-emitting element layer 130 may be located on the circuit layer 120. The light-emitting element layer 130 may include a light-emitting element. For example, the light-emitting element layer 130 may include an organic light-emitting material, a quantum dot, a quantum rod, a micro LED, or a nano LED. The light-emitting element 100PE may include a first electrode AE, a light-emitting element layer EL, and a second electrode CE.

The first electrode AE may be located on the sixth insulating layer 60. The first electrode AE may be connected to the second connection electrode CNE2 via a contact hole CNT-3 that passes through the sixth insulating layer 60.

The pixel defining film 70 may be located on the sixth insulating layer 60 and may cover a portion of the first electrode AE. An opening 70-OP may be defined in the pixel defining film 70. The opening 70-OP of the pixel defining film 70 may expose at least a portion of the first electrode AE. According to some embodiments, the light-emitting region PXA is defined corresponding to a partial region of the first electrode AE exposed by the opening portion 70-OP. A non-light-emitting region NPXA may surround the light-emitting region PXA.

The light-emitting layer EL may be located on the first electrode AE. The light-emitting layer EL may be located in the opening 70-OP. That is, the light-emitting layer EL may be separately formed in each of the pixels. When the light-emitting layer EL is separately formed in each of the pixels, each of the light-emitting layers EL may emit light of at least one color among blue, red, and green. However, embodiments of the present disclosure are not limited thereto, and the light-emitting layer EL may be connected to the pixels and provided in common. In this case, the light-emitting layer EL may provide blue light or white light.

The second electrode CE may be located on the light-emitting layer EL. The second electrode CE may have an integral shape and may be located, in common, in the plurality of pixels. A common voltage may be applied to the second electrode CE, and the second electrode CE may be referred to as a common electrode.

According to some embodiments, a hole control layer may be located between the first electrode AE and the light-emitting layer EL. The hole control layer may be formed as a common layer in the light-emitting region PXA and the non-light-emitting region NPXA. The hole control layer may include a hole transport layer and may further include a hole injection layer. An electron control layer may be located between the light-emitting layer EL and the second electrode CE. The electron control layer may include an electron transport layer and may further include an electron injection layer. The hole control layer and the electron control layer ECL may be formed, in common, in the plurality of pixels by using an open mask.

The encapsulation layer 140 may be located on the light-emitting element layer 130. The encapsulation layer 140 may include an inorganic layer, an organic layer, and an inorganic layer which are stacked in this order, but layers constituting the encapsulation layer 140 are not limited thereto.

The inorganic layers may protect the light-emitting element layer 130 from moisture and oxygen, and the organic layer may protect the light-emitting element layer 130 from foreign substances such as dust particles. The inorganic layers may each include a silicon nitride layer, a silicon oxynitride layer, a silicon oxide layer, a titanium oxide layer, an aluminum oxide layer, or the like. The organic layer may include an acrylic organic layer, but embodiments of the present disclosure are not limited thereto.

The input sensor 200 may be formed on the display panel 100 through a continuous process. In this case, the input sensor 200 may be expressed as being located directly on the display panel 100. Being located directly may mean that a third component is not located between the input sensor 200 and the display panel 100. That is, a separate adhesive member may not be located between the input sensor 200 and the display panel 100. In this case, the thickness of the electronic device 1000 may be thinner.

The input sensor 200 may include a base insulating layer 201, a first conductive layer 202, a sensing insulating layer 203, a second conductive layer 204, and a cover insulating layer 205.

The base insulating layer 201 may be an inorganic layer including at least one of silicon nitride, silicon oxynitride, or silicon oxide. Alternatively, the base insulating layer 201 may be an organic layer including an epoxy resin, an acryl resin, or an imide-based resin. The base insulating layer 201 may have a single-layer structure or a multilayer structure in which layers are stacked along the third direction DR3.

Each of the first conductive layer 202 and the second conductive layer 204 may have a single-layer structure or a multilayer structure in which layers are stacked along the third direction axis DR3.

The conductive layer having a single-layer structure may include a metal layer or a transparent conductive layer. The metal layer may include molybdenum, silver, titanium, copper, aluminum, or an alloy thereof. The transparent conductive layer may include a transparent conductive oxide such as indium tin oxide (ITO), indium zinc oxide (IZO), zinc oxide (ZnO) or indium zinc tin oxide (IZTO). In addition, the transparent conductive layer may include a conductive polymer such as PEDOT, metal nanowires, graphene, or the like.

The conductive layer having a multi-layered structure may include metal layers. The metal layers may have, for example, a three-layer structure of titanium/aluminum/titanium. The conductive layer having a multi-layered structure may include at least one metal layer and at least one transparent conductive layer.

At least one of the sensing insulating layer 203 or the cover insulating layer 205 may include an inorganic film. The inorganic film may include at least one of aluminum oxide, titanium oxide, silicon oxide, silicon oxynitride, zirconium oxide, or hafnium oxide.

A parasitic capacitance Cb may be generated between the input sensor 200 and the second electrode CE. As the distance between the input sensor 200 and the second electrode CE gets closer, the parasitic capacitance Cb may be greater. As the parasitic capacitance Cb is greater, the ratio of the amount of change in capacitance to a reference value may become smaller. The amount of change in capacitance may mean a change in capacitance that occurs before and after input by an input mean such as an input device 2000 (see FIG. 2) or the user's body 3000 (see FIG. 3).

A driving chip that processes the signal sensed from the input sensor 200 may perform a leveling operation in which a value corresponding to the parasitic capacitance (Cb) is removed from the sensed signal. By the leveling operation, the ratio of the amount of change in capacitance to the reference value may be increased, so that sensing sensitivity may be improved.

Depending on the specifications of the driving chip, however, there may be a difference in the ability to remove a value corresponding to the parasitic capacitance Cb. For example, if the maximum parasitic capacitance Cb is about 500 pF and the capacitance value that may be removed by the driving chip from the signal sensed from the input sensor 200 is about 200 pF, the reference value may not be sufficiently lowered by the driving chip. In this case, since the ratio of the amount of change in capacitance is insignificant compared to the reference value, the driving chip may recognize the amount of change in capacitance as noise or fail to recognize the amount of change in capacitance, resulting in a malfunction of failing to detect touch coordinates. According to some embodiments of the present disclosure, it may be possible to provide the maximum value of the parasitic capacitance Cb below a predetermined value by modifying the electrode structure of the input sensor 200. In this case, even when the performance of the driving chip is relatively low, the coordinate recognition accuracy may be improved. The predetermined value may be about 200 pF, but is not particularly limited thereto.

Figure 4:
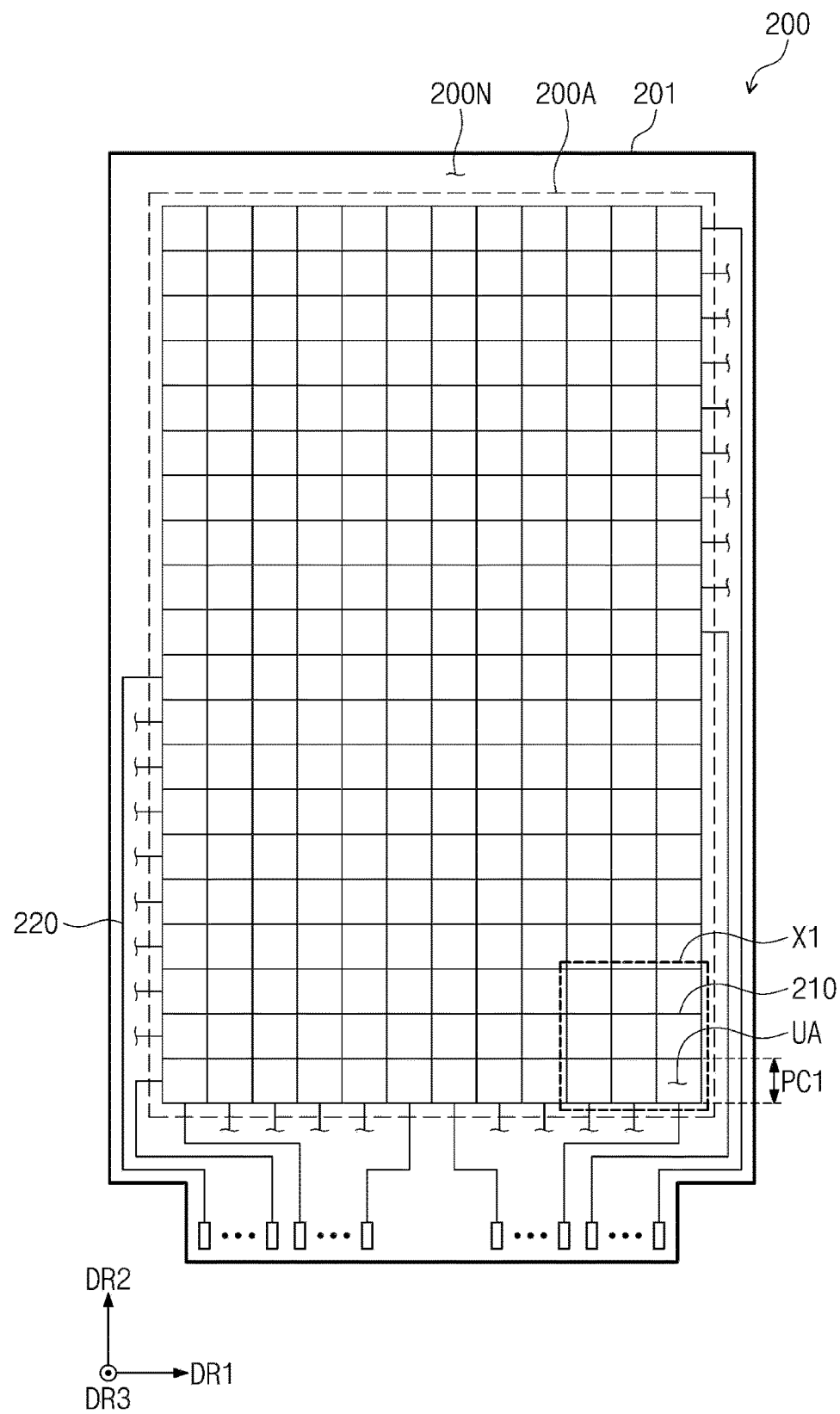
FIG. 4 is a plan view illustrating a sensor layer according to some embodiments.

FIG. 4 is a plan view illustrating a sensor layer according to some embodiments of the present disclosure.

Referring to FIG. 4, the input sensor 200 may include an active region 200A and a peripheral region 200N. The active region 200A may be a region which is activated in response to an electrical signal. For example, the active region 200A may be a region which senses an input. The peripheral region 200N may surround the active region 200A.

The input sensor 200 may include a base insulating layer 201, a plurality of unit sensors 210, and a plurality of wires 220. The plurality of unit sensors 210 may be located in the active region 200A. The plurality of wires 220 may be located in the peripheral region 200N.

The plurality of unit sensors 210 may be arranged along the first direction DR1 and the second direction DR2. The plurality of wires 220 may be electrically connected to the plurality of unit sensors 210.

The plurality of unit sensors 210 may have a first pitch PC1. The first pitch PC1 of the plurality of unit sensors 210 may be smaller than the first width WE1 (see FIG. 2) of the input region of the user's body 3000 (see FIG. 2). The first pitch PC1 may be about 3.5 mm (millimeter) to about 4.5 mm. For example, the first pitch PC1 may be about 4 mm. According to some embodiments, an area of each of the plurality of unit sensors 210 may be smaller than an area of the input region of the user's body 3000 (see FIG. 2). Accordingly, the input sensor 200 may accurately sense the coordinates input by the user's body 3000 (see FIG. 2).

The plurality of unit sensors 210 may include a first sensing electrode and a second sensing electrode crossing the first sensing electrode.

The input sensor 200 may operate in a first mode in which information about an external input is obtained through a change in mutual capacitance between sensing electrodes included in the plurality of unit sensors 210 or in a second mode in which an input by the input device 2000 (see FIG. 2) is sensed through a change in capacitance of each of the sensing electrodes included in the plurality of unit sensors 210.

According to some embodiments, when the input device 2000 approaches the input sensor 200, the input sensor 200 may enter a second mode for sensing the input device 2000. The input device 2000 may transmit/receive data to/from a sensor controller through the input sensor 200.

In the second mode, each of the plurality of first sensing electrodes 211 and the plurality of second sensing electrodes 212 may be used as a transmitting electrode for supplying uplink signals ULS provided from the sensor controller to the input device 2000. In the second mode, each of the plurality of first sensing electrodes 211 and the plurality of second sensing electrodes 212 may be used as a receiving electrode for supplying downlink signals DLS provided from the input device 2000 to the sensor controller of the input sensor 200. That is, in the second mode, the plurality of first sensing electrodes 211 and the plurality of second sensing electrodes 212 may be all used as transmitting electrodes or may be used as receiving electrodes.

Figure 5:
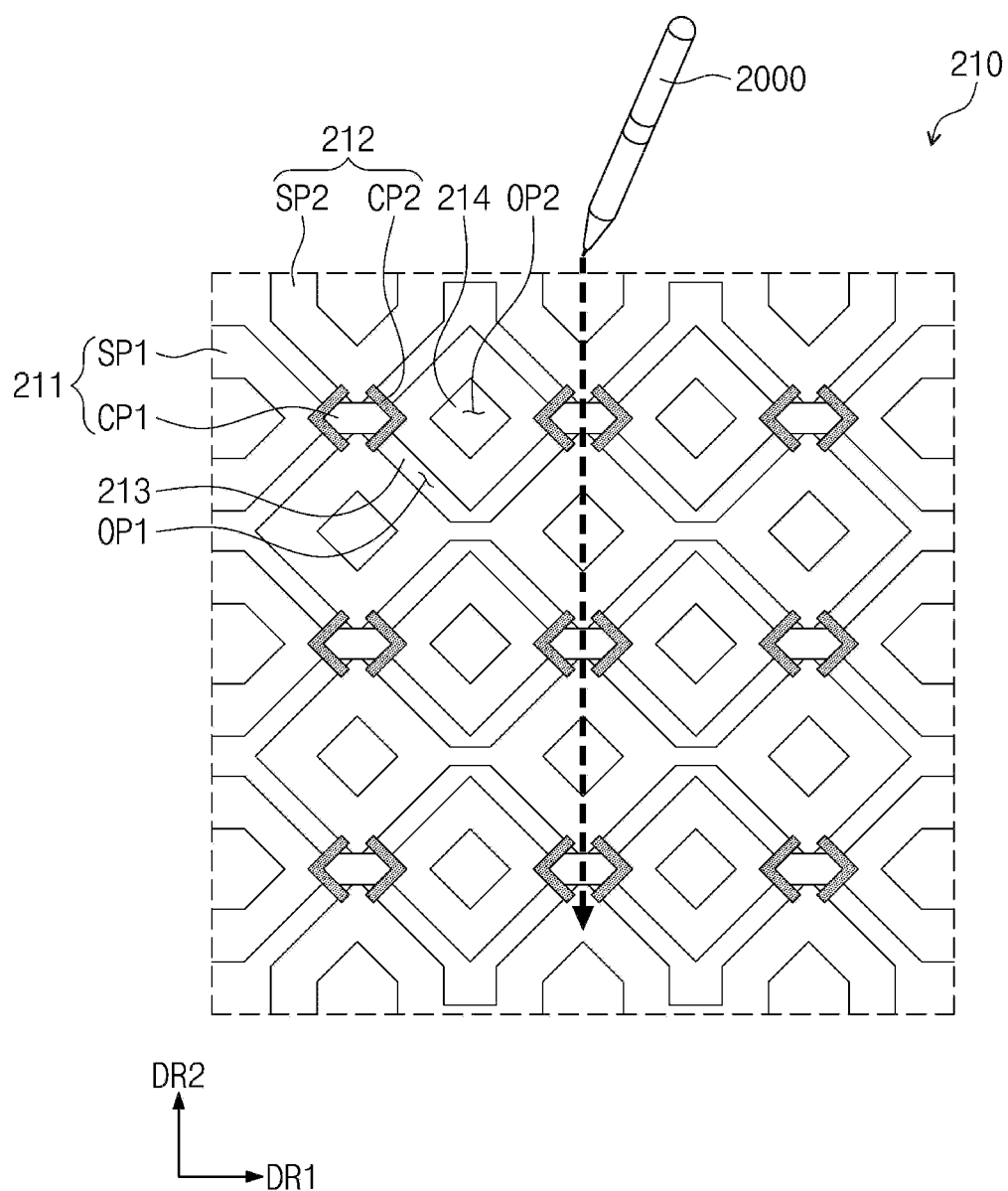
FIG. 5 is a view illustrating a unit sensor according to some embodiments.

FIG. 5 is a view illustrating a unit sensor according to some embodiments of the present disclosure.

Referring to FIG. 5, the unit sensor 210 may include a first sensing electrode 211, a second sensing electrode 212, a first dummy electrode 213, and a second dummy electrode 214.

The first sensing electrode 211 may extend in the first direction DR1 in a bar shape and may be provided in plurality. The second sensing electrode 212 may extend in the second direction DR2 in a bar shape and may be provided in plurality. The first sensing electrode 211 and the second sensing electrode 212 may cross each other. A plurality of the first sensing electrodes 211 may be arranged in the second direction DR2. A plurality of second sensing electrodes 212 may be arranged in the first direction DR1.

In FIG. 5, three first sensing electrodes 211 and three second sensing electrodes 212 may be located in one unit sensor 210. However, embodiments according to the present disclosure are not limited thereto.

The first sensing electrodes 211 may sense movement of the input device 2000 in the second direction DR2. The second sensing electrodes 212 may sense movement of the input device 2000 in the first direction DR1.

The first sensing electrode 211 may include a plurality of first sensing units SP1 and a plurality of first connection units CP1. Each of the plurality of first connection units CP1 may connect two adjacent first sensing units SP1 among the plurality of first sensing units SP1.

The second sensing electrode 212 may include a plurality of second sensing units SP2 and a plurality of second connection units CP2. Each of the plurality of second connection units CP2 may connect two adjacent second sensing units SP2 among the plurality of second sensing units SP2.

A plurality of first openings OP1 may be defined between the first sensing units SP1 and the second sensing units SP2. Second opening OP2 may be respectively defined in the first sensing units SP1 and the second sensing units SP2.

The first sensing units SP1, the second sensing units SP2, and the first connection units CP1 may be located on the same layer. The second connection units CP2 may be located on a layer different from layers on which the first sensing units SP1, the second sensing units SP2, and the first connection units CP1 are located. According to some embodiments, the first sensing units SP1, the second sensing units SP2, and the first connection units CP1 may be located on the second conductive layer 204 (see FIG. 3). The second connection units CP2 may be located on the first conductive layer 202.

Each of the second connection units CP2 may include a first bridge pattern BRP1. The first bridge pattern BRP1 may be provided in plurality. In FIG. 5, two first bridge patterns BRP1 may be provided. However, this is only an example, and the first bridge pattern BRP1 may be provided in one or at least two.

The first dummy electrode 213 may be located in the first openings OP1. The second dummy electrode 214 may be located in the second openings OP2. The first dummy electrode 213 and the second dummy electrode 214 may float to be electrically insulated from the first sensing electrode 211 and the second sensing electrode 212. The first dummy electrode 213 and the second dummy electrode 214 may be patterned on a layer same as a layer on which the first sensing electrode 211 and the second sensing electrode 212 are located.

In FIG. 5, when the input device 2000 moves in the second direction DR2, the movement may be sensed by the first sensing electrodes 211. In this regard, details will be described later.

Figure 6A:
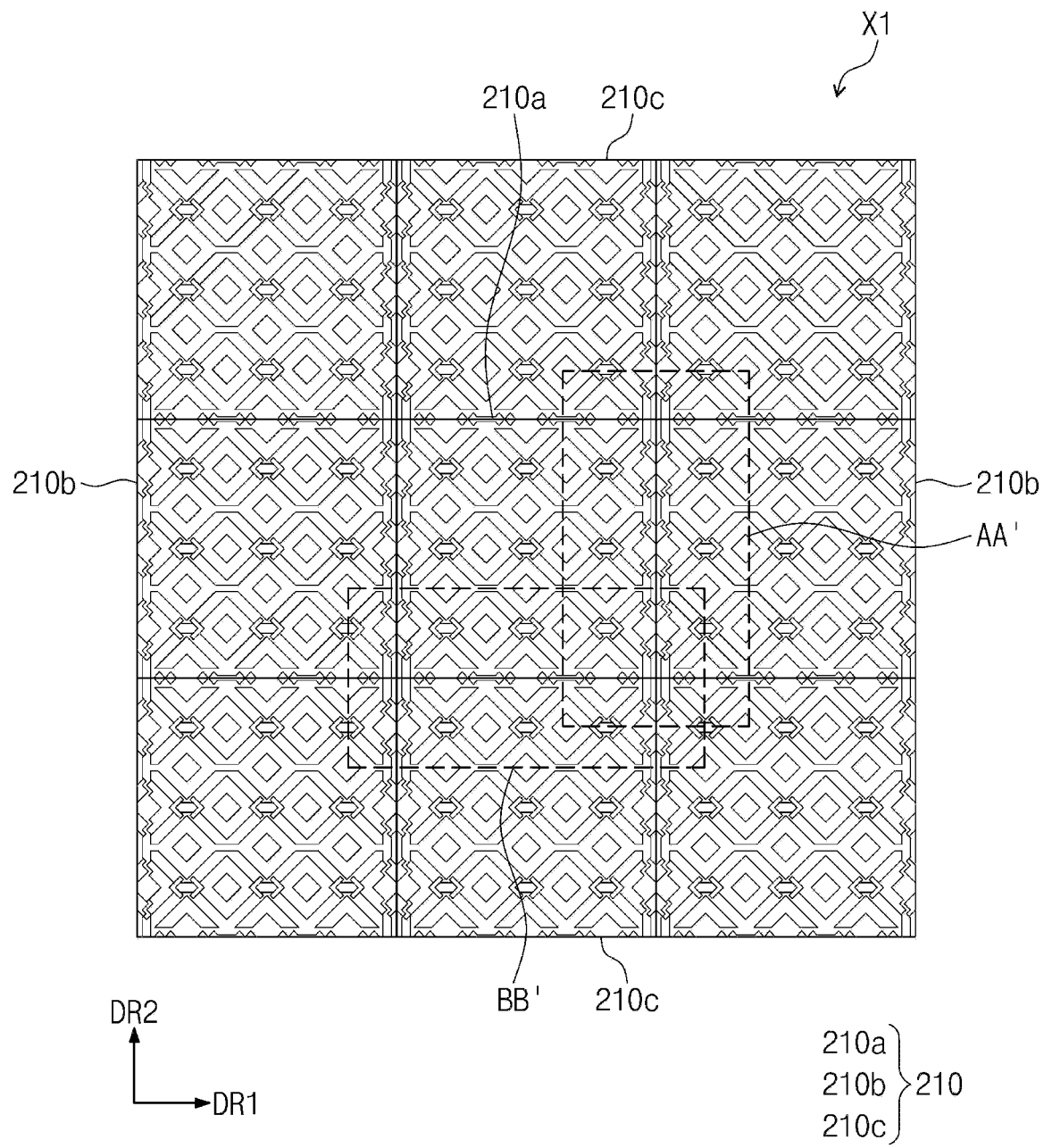
FIGS. 6A and 6B are views illustrating a partial region of an input sensor according to some embodiments.
Figure 6B:
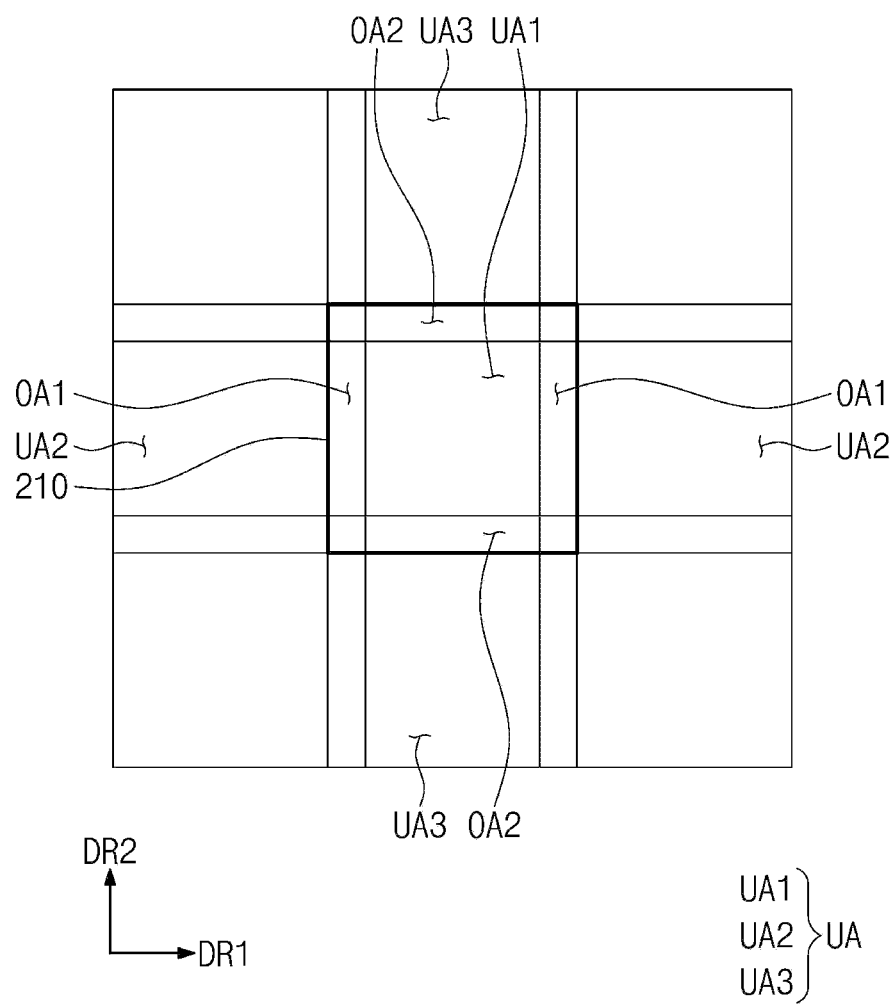
Figure 7A:
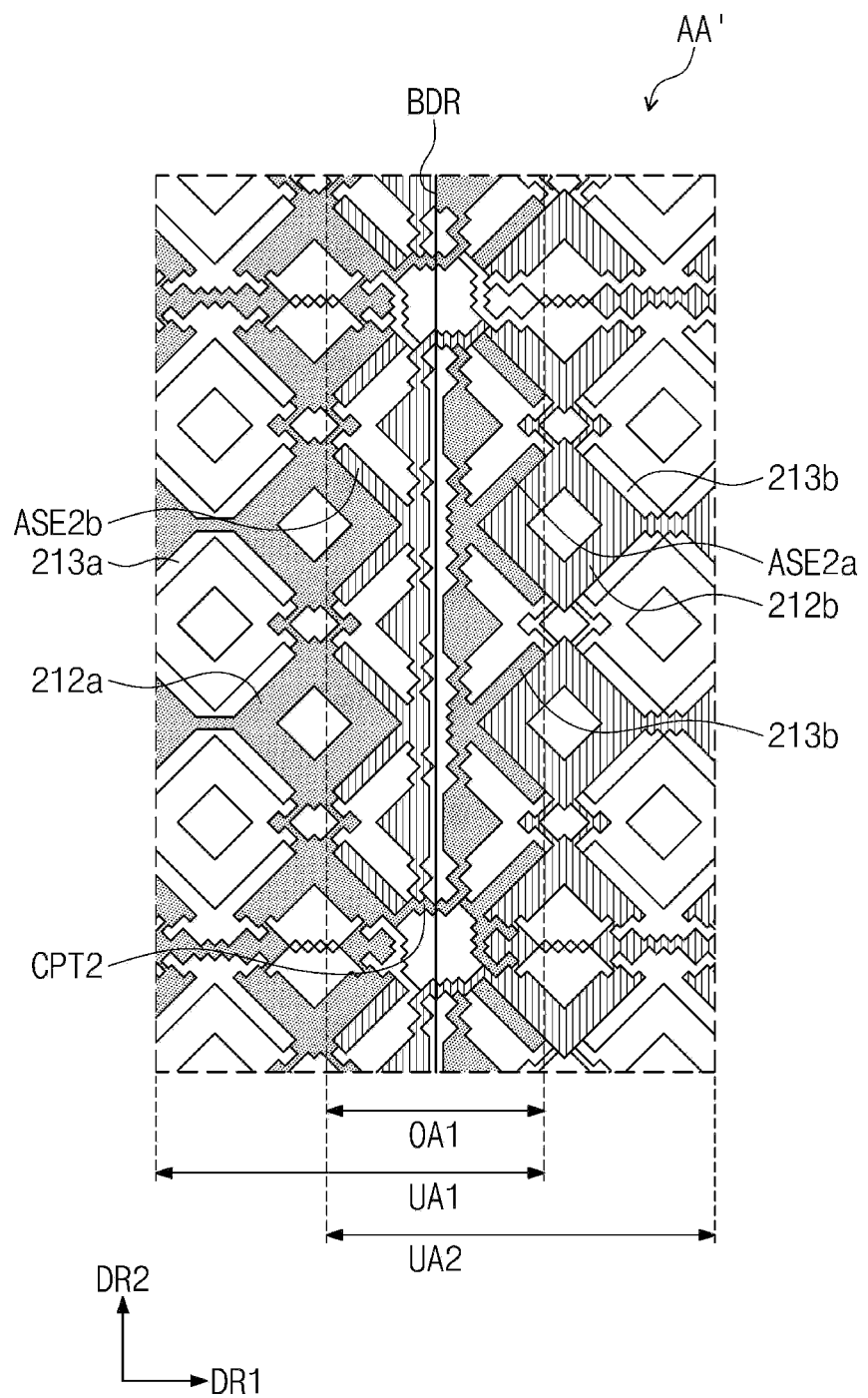
FIGS. 7A and 7B are enlarged views of the partial region of FIG. 6 according to some embodiments.
Figure 7B:
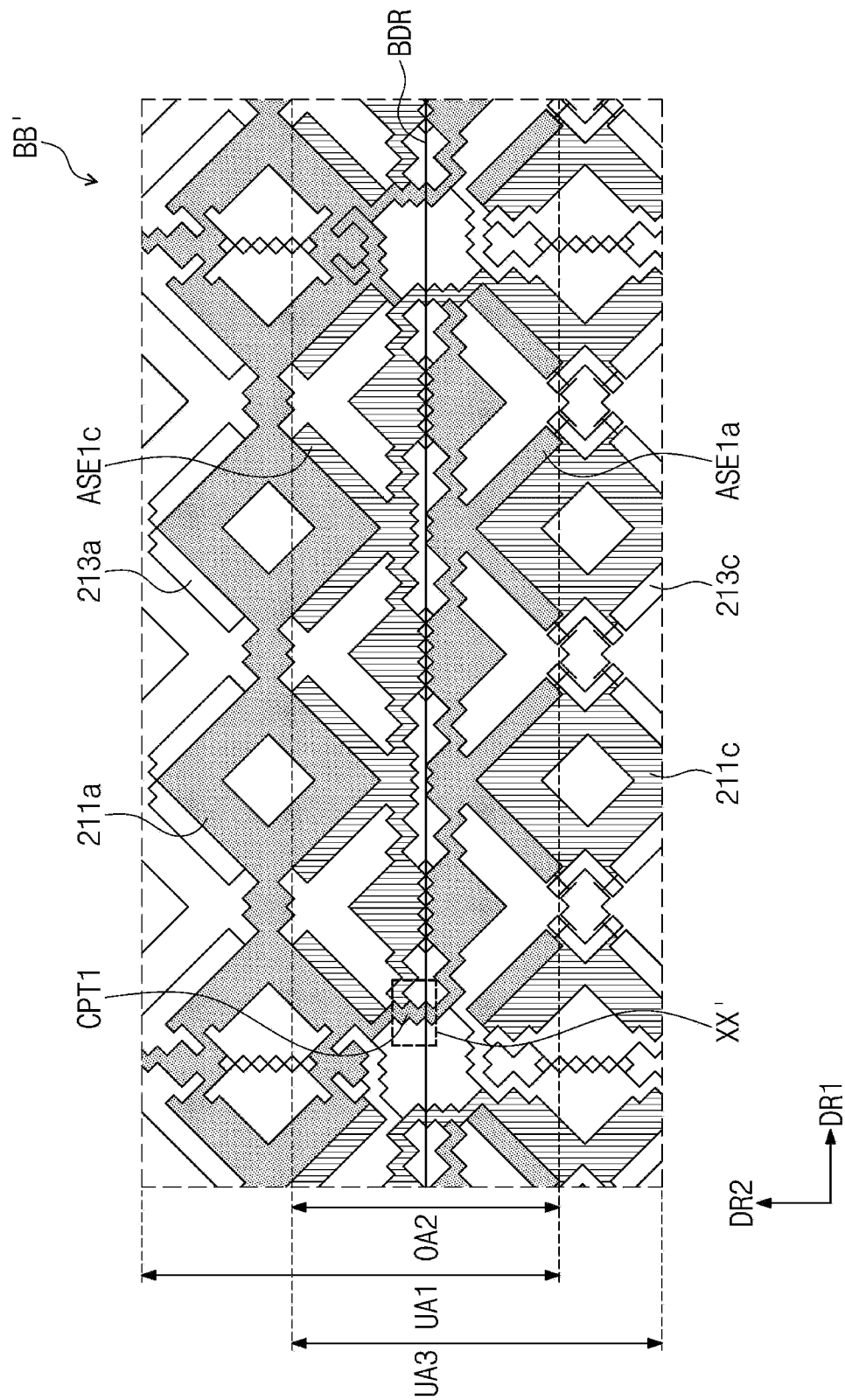
Figure 8A:
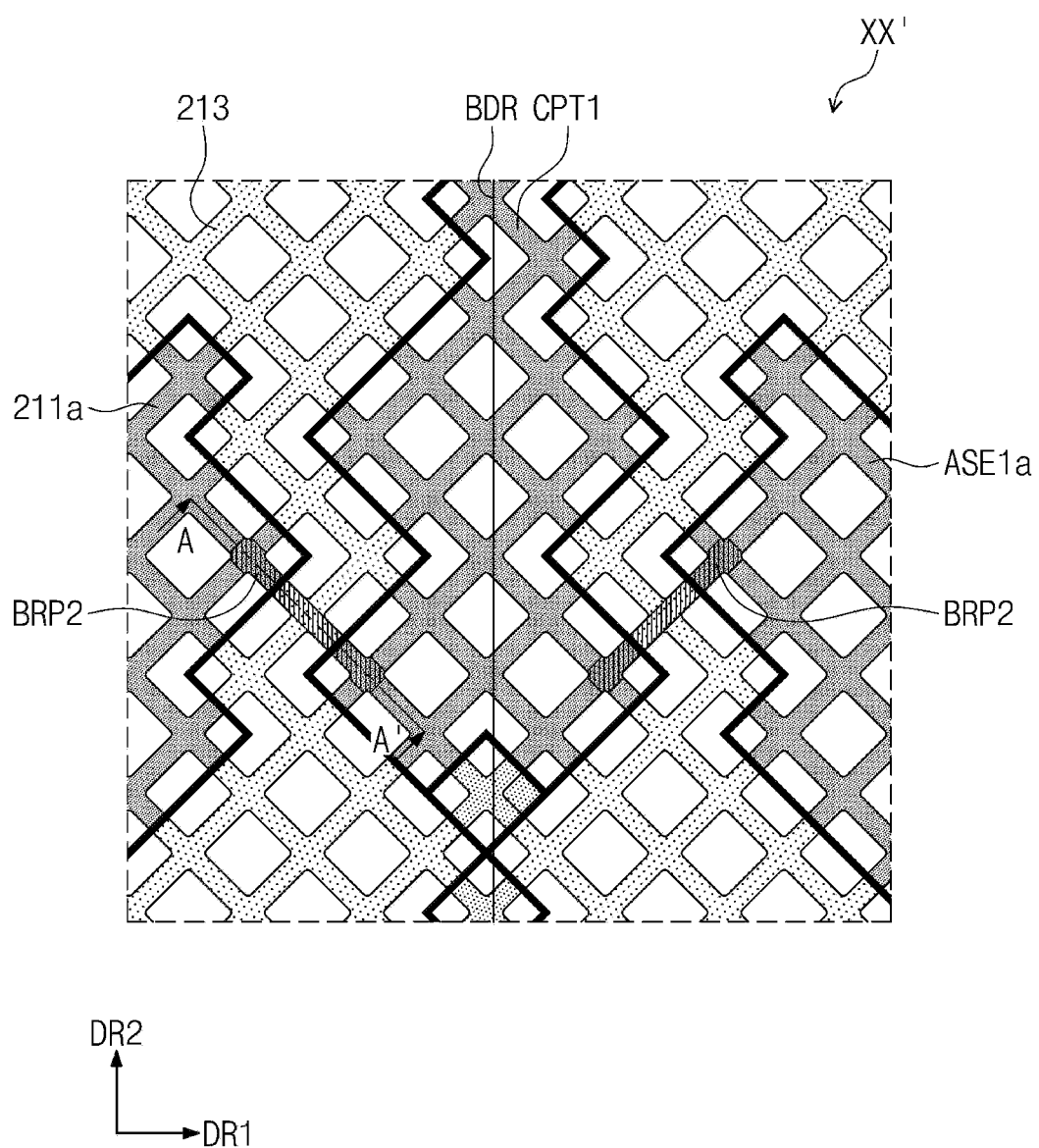
FIG. 8A is an enlarged view of the partial region of FIG. 7B according to some embodiments.
Figure 8B:
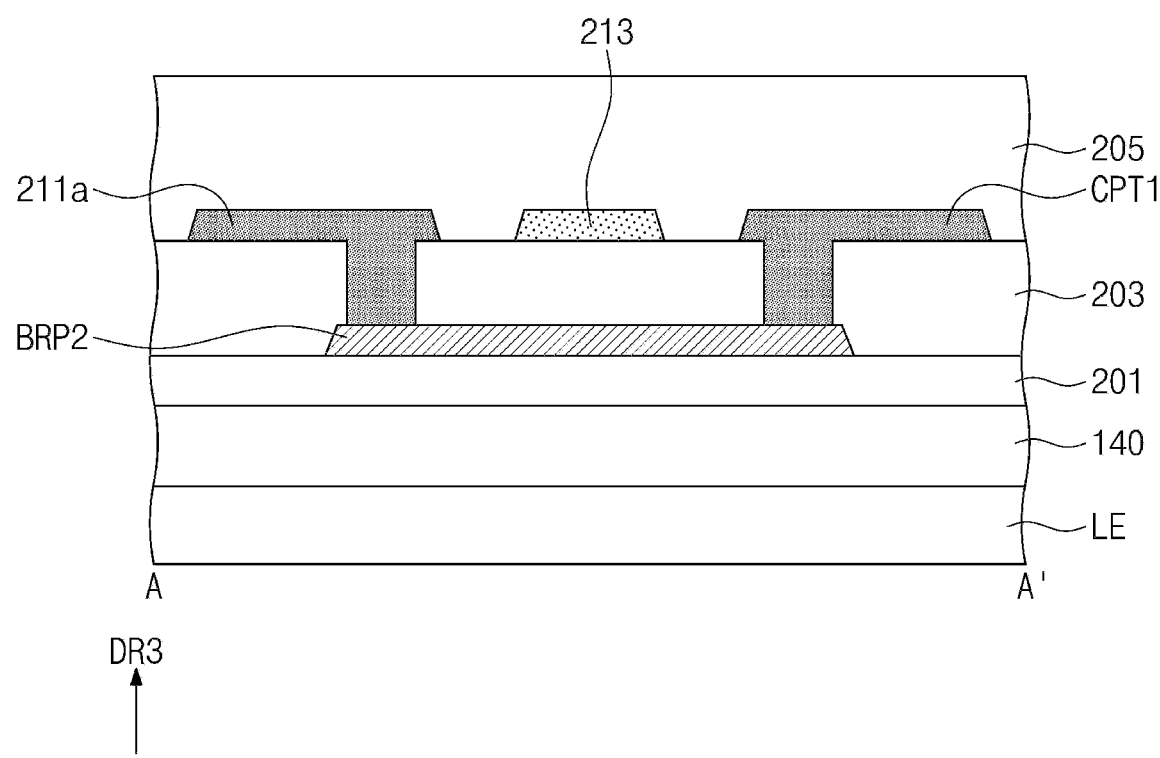
FIG. 8B is a cross-sectional view taken along the line AA' of FIG. 8A.

FIGS. 6A and 6B are views illustrating a partial region of an input sensor according to some embodiments of the present disclosure. FIGS. 7A and 7B are enlarged views of the partial region of FIG. 6 according to some embodiments of the present disclosure. FIG. 8A is an enlarged view of the partial region of FIG. 7B according to some embodiments of the present disclosure. FIG. 8B is a cross-sectional view taken along the line AA' of FIG. 8A.

FIG. 6A is an enlarged plan view illustrating an X1 region of FIG. 4. FIG. 6B is a view illustrating regions of FIG. 6A.

FIG. 7A is an enlarged plan view illustrating AA' of FIG. 6.
FIG. 7B is an enlarged plan view illustrating BB' of FIG. 6.

Referring to FIGS. 6A and 6B, the input sensor 200 may include a plurality of unit sensors 210 located adjacent to each other. The plurality of unit sensors 210 may be located in a plurality of unit sensor regions UA. FIG. 6A illustrates that nine unit sensors 210 are located in each of unit sensor regions.

According to some embodiments, the plurality of unit sensors 210 may include a first unit sensor 210a, a second unit sensor 210b, and a third unit sensor 210c. The first unit sensor 210a may be located in a first unit sensor region UA1, the second unit sensor 210b may be located in a second unit sensor region UA2, and the third unit sensor 210c may be located in a third unit sensor region UA3.

The first unit sensor 210a and the second unit sensor 210b are adjacent to each other in the first direction DR1. The first unit sensor 210a and the third unit sensor 210c are adjacent to each other in the second direction DR2.

Referring to FIGS. 6B, 7A, and 7B, the plurality of unit sensor regions UA may include a first region OA1 and a second region OA2. The first region OA1 may correspond to a region in which the first unit sensor region UA1 and the second unit sensor region UA2 overlap. The second region OA2 may correspond to a region in which the first unit sensor region UA1 and the second unit sensor region UA3 overlap.

That is, a portion of the first unit sensor 210a and a portion of the second unit sensor 210b may be located in the first region OA1. A portion of the first unit sensor 210a and a portion of the third unit sensor 210c may be located in the second region OA2.

Each of the plurality of unit sensors 210 may further include a first additional sensing electrode ASE1 and a second additional sensing electrode ASE2. That is, the first unit sensor 210a, the second unit sensor 210b, and the third unit sensor 210c may each include the first additional sensing electrode ASE1 and the second additional sensing electrode ASE2.

The first additional sensing electrode ASE1 may be connected to the first sensing electrode 211. The second additional sensing electrode ASE2 may be connected to the second sensing electrode 212. The first additional sensing electrode ASE1 may be located in the second region OA2. The second additional sensing electrode ASE2 may be located in the first region OA1.

In FIG. 7A, a second additional sensing electrode ASE2a of the first unit sensor 210a and a second additional sensing electrode ASE2b of the second unit sensor 210b may be located in the first region OA1. The first unit sensor 210a and the second unit sensor 210b may be symmetrical to each other with respect to a sensor boundary BDR.

In FIG. 7B, a first additional sensing electrode ASE1a of the first unit sensor 210a and a first additional sensing electrode ASE1c of the third unit sensor 210c may be located in the second region OA2. The first unit sensor 210a and the third unit sensor 210c may be symmetrical to each other with respect to the sensor boundary BDR.

In FIGS. 7A and 7B, first sensing electrodes 211a of the first unit sensor 210a may be electrically connected to first dummy electrodes 213c of the third unit sensor 210c. Second sensing electrodes 212a of the first unit sensor 210a may be electrically connected to first dummy electrodes 213b of the second unit sensor 210b. The first sensing electrodes 211a of the first unit sensor 210a may be electrically connected to first adjacent dummy electrodes adjacent to the first unit sensor 210a among the first dummy electrodes 213c of the third unit sensor 210c. The second sensing electrodes 212a of the first unit sensor 210a are connected to first adjacent dummy electrodes adjacent to the first unit sensor 210a among the first dummy electrodes 213b of the second unit sensor 210b.

Here, the first adjacent dummy electrodes may be the first additional sensing electrodes ASE1 or the second additional sensing electrodes ASE2. That is, the first adjacent dummy electrodes of the third unit sensor 210c electrically connected to the first sensing electrodes 211a of the first unit sensor 210a may be first additional sensing electrodes ASE1a of the first unit sensor 210a. The first adjacent dummy electrodes of the second unit sensor 210b electrically connected to the second sensing electrodes 212a of the first unit sensor 210a may be second additional sensing electrodes ASE2a of the first unit sensor 210a.

According to some embodiments, the first sensing electrode 211 and the second sensing electrode 212 of the unit sensor 210 may be electrically connected to dummy electrodes of another adjacent unit sensor to form the first additional sensing electrode ASE1 and the second additional sensing electrode ASE2. That is, the first additional sensing electrode ASE1 and the second additional sensing electrode ASE2 may be located in the first openings OP1.

FIG. 8A is an enlarged view of a region XX' of FIG. 7B.
FIG. 8B is a cross-sectional view taken along line AA' of FIG. 8A.

Referring to FIGS. 8A and 8B, the unit sensor 210 may include a second bridge pattern BRP2. The second bridge pattern BRP2 may connect the first sensing electrode 211 and the first additional sensing electrode ASE1. The second bridge pattern BRP2 may connect the second sensing electrode 212 and the second additional sensing electrode ASE2. The second bridge pattern BRP2 may be patterned on a layer on which the first bridge pattern BRP1 is located.

According to some embodiments, the first sensing electrode 211 may include a first connection pattern CPT1, and the second sensing electrode 212 may include a second connection pattern CPT2. The first connection pattern CPT1 may extend from the first sensing electrode 211 most adjacent to the first additional sensing electrode ASE1 among the plurality of first sensing electrodes 211. The second connection pattern CPT2 may extend from the second sensing electrode 212 most adjacent to the second additional sensing electrode ASE2 among the plurality of second sensing electrodes 212.

The second bridge pattern BRP2 connects the first connection pattern CPT1 located on a sensor boundary BDR to the first additional sensing electrode ASE1. The second bridge pattern BRP2 connects the second connection pattern CPT2 and the second additional sensing electrode ASE2.

The first connection pattern CPT1 may be directly connected to the first additional sensing electrode ASE1 and thus the first sensing electrode 211 and the first additional sensing electrode ASE1 may be electrically connected. The second connection pattern CPT2 may be directly connected to the second additional sensing electrode ASE2 and thus the second sensing electrode 212 and the second additional sensing electrode ASE2 may be electrically connected. The first connection pattern CPT1 and the second connection pattern CPT2 may be located on a layer same as a layer on which the first sensing electrode 211 and the second sensing electrode 212 are located, and may be located on a layer different from a layer on which the second bridge pattern BRP2 is located.

For example, the second bridge pattern BRP2 may connect the first sensing electrode 211 or the second sensing electrode 212 with the first connection pattern CPT1 or the second connection pattern CPT2. The second bridge pattern BRP2 may connect the first or second connection patterns CPT1 or CPT2 with the first additional sensing electrode ASE1 or the second additional sensing electrode ASE2. As a result, the second bridge pattern BRP2 may connect the first or second sensing electrodes 211 or 212 with the first or second additional sensing electrodes ASE1 or ASE2. In FIG. 8A, the second bridge pattern BRP2 connects the first sensing electrodes 211a and the first connection pattern CPT1 and connects the first connection pattern CPT1 and the first additional sensing electrode ASE1a.

In FIG. 8B, the second bridge pattern BRP2 may be located on the base insulating layer 201. The first sensing electrode 211, the second connection pattern CPT2, and the first additional sensing electrode ASE1 may be located on the sensing insulating layer 203. The second bridge pattern BRP2 and the first sensing electrode, and the second connection pattern CPT2 and the first additional sensing electrode ASE1 may be electrically connected through a contact hole. A duplicate description made with reference to FIG. 3 in relation to other configurations will be omitted.

As illustrated in FIG. 5, the unit sensor 210 may include a plurality of second dummy electrodes 214 respectively arranged in the second opening OP2. The plurality of second dummy electrodes 214 may include a second adjacent dummy electrode adjacent to another adjacent unit sensor.

According to some embodiments, the first additional sensing electrode ASE1 and the second additional sensing electrode ASE2 may be located in the second opening OP2. That is, the first additional sensing electrode ASE1 and the second additional sensing electrode ASE2 located in the first opening OP1 may extend to the second opening OP2.

Referring to FIGS. 5 and 7A, the second additional sensing electrodes ASE2a and ASE2b may be connected to the second dummy electrode 214 located in the second opening OP2. The second additional sensing electrodes ASE2a and ASE2b may be electrically connected to adjacent second adjacent dummy electrodes 214 among a plurality of third dummy electrodes 214. The second additional sensing electrodes ASE2a and ASE2b may be extended by being connected to the second adjacent dummy electrode through bridge patterns. Detailed description will be made with reference to FIG. 10.

Figure 9:
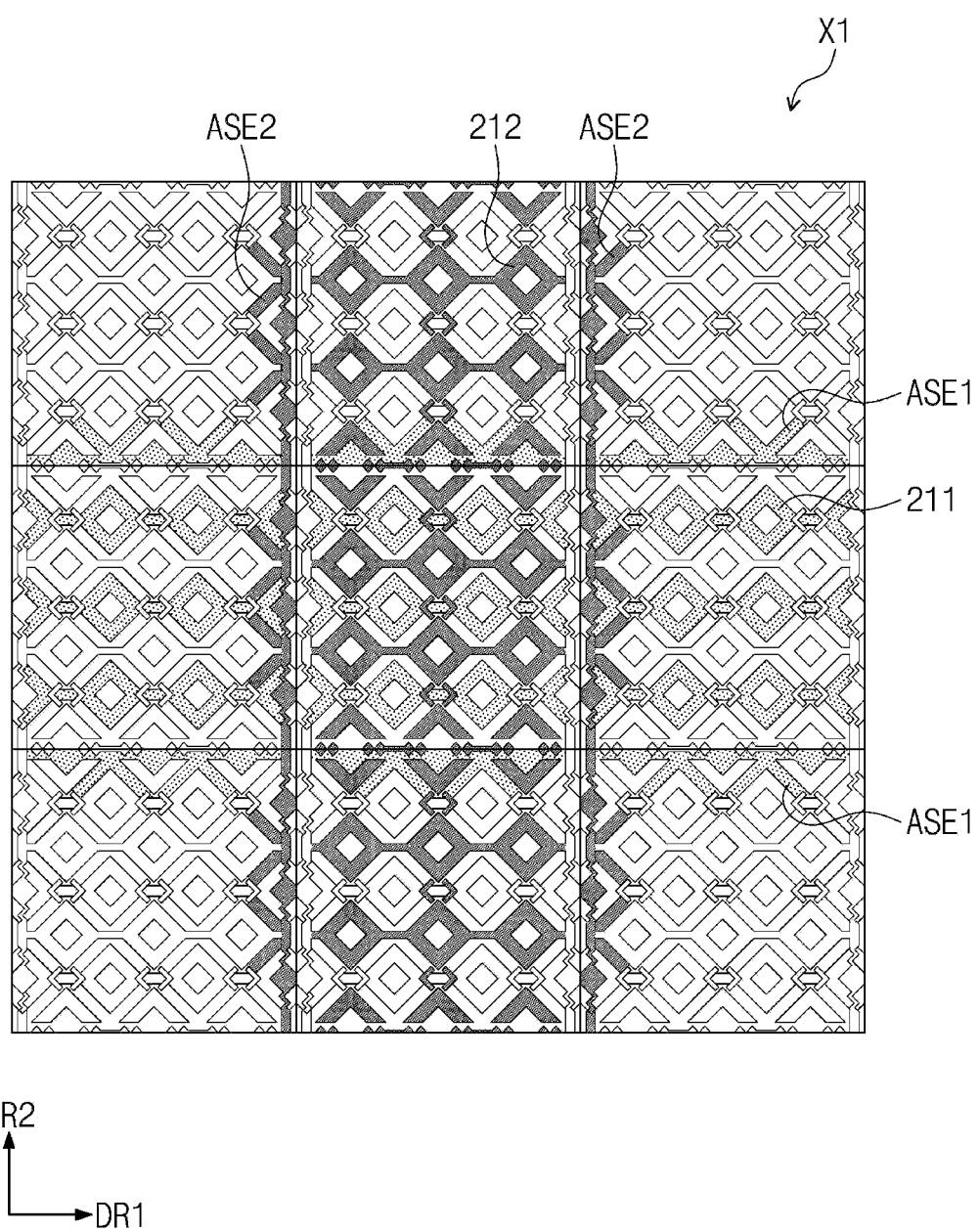
FIG. 9 is a view illustrating a partial region of an input sensor according to some embodiments.
Figure 10:
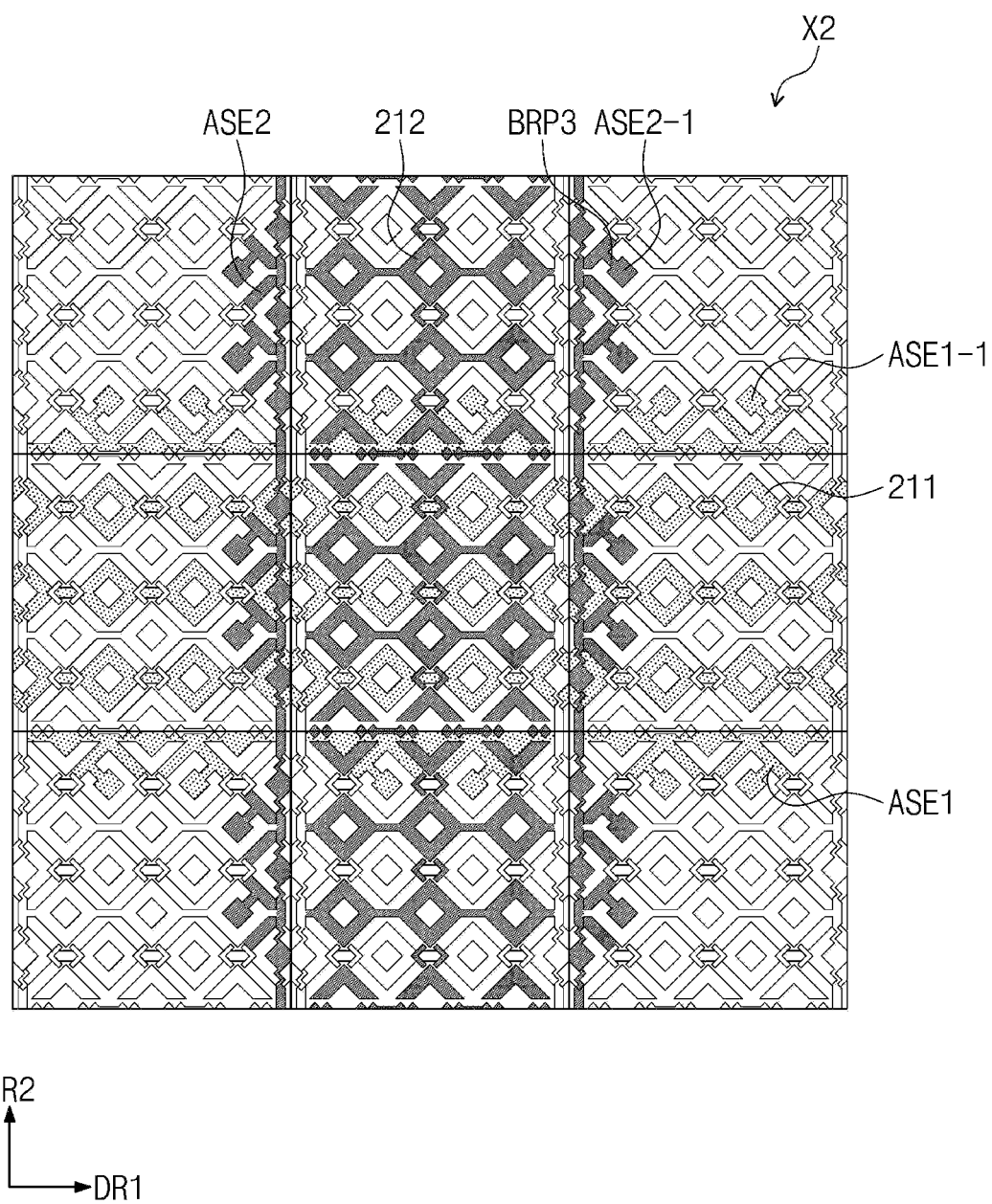
FIG. 10 is a view illustrating a partial region of an input sensor according to some embodiments.

FIG. 9 is a view illustrating a partial region of an input sensor according to some embodiments of the present disclosure. FIG. 10 is a view illustrating a partial region of an input sensor according to some embodiments of the present disclosure.

FIG. 9 illustrates a state in which the unit sensor is extended due to the first additional sensing electrode ASE1 and the second additional sensing electrode ASE2 in the X1 region. Unlike the X1 region of FIG. 9, FIG. 10 illustrates that unit sensors each including an extended first additional sensing electrode ASE1-1 and a second additional sensing electrode ASE2-1 are located.

In FIG. 9, the first additional sensing electrode ASE1 and the second additional sensing electrode ASE2 may be located only in the first opening OP1 (see FIG. 5). Referring to FIG. 10, the first additional sensing electrode ASE1-1 and the second additional sensing electrode ASE2-1 may also be located in the second opening OP2 (see FIG. 5). That is, the first additional sensing electrode ASE1-1 and the second additional sensing electrode ASE2-1 may extend from the first opening OP1 to the second opening OP2. According to some embodiments, the first additional sensing electrode ASE1-1 and the second additional sensing electrode ASE2-1 may be respectively arranged, among the second openings OP2, in the second opening OP2 adjacent to the first sensing electrode 211 and the second opening OP2 adjacent to the second sensing electrode 212. The first additional sensing electrode ASE1 and the second additional sensing electrode ASE2 which are located in the first opening OP1 and the first additional sensing electrode ASE1-1 and the second additional sensing electrode ASE2-1 which are located in the second opening OP2 may be connected through third bridge patterns BRP3. The first additional sensing electrodes ASE1 and ASE1-1 and the second additional sensing electrodes ASE2 and ASE2-1 may be located on the same layer, and the third bridge pattern BRP3 may be located on a layer different from a layer on which the first additional sensing electrode ASE1 and ASE1-1 and a second additional sensing electrode ASE2 and ASE2-1 are located. The third bridge pattern BRP3 may be located on a same layer as a layer on which the second bridge pattern BRP2 (see FIG. 8B) is located.

Among the plurality of second openings OP2 (see FIG. 5), the first or second additional sensing electrodes ASE1-1 and ASE2-1 may be located in the second openings OP2 adjacent to the adjacent unit sensor, and the second dummy electrode 214 (see FIG. 5) may be located in the remaining second openings OP2.

Figure 11A:
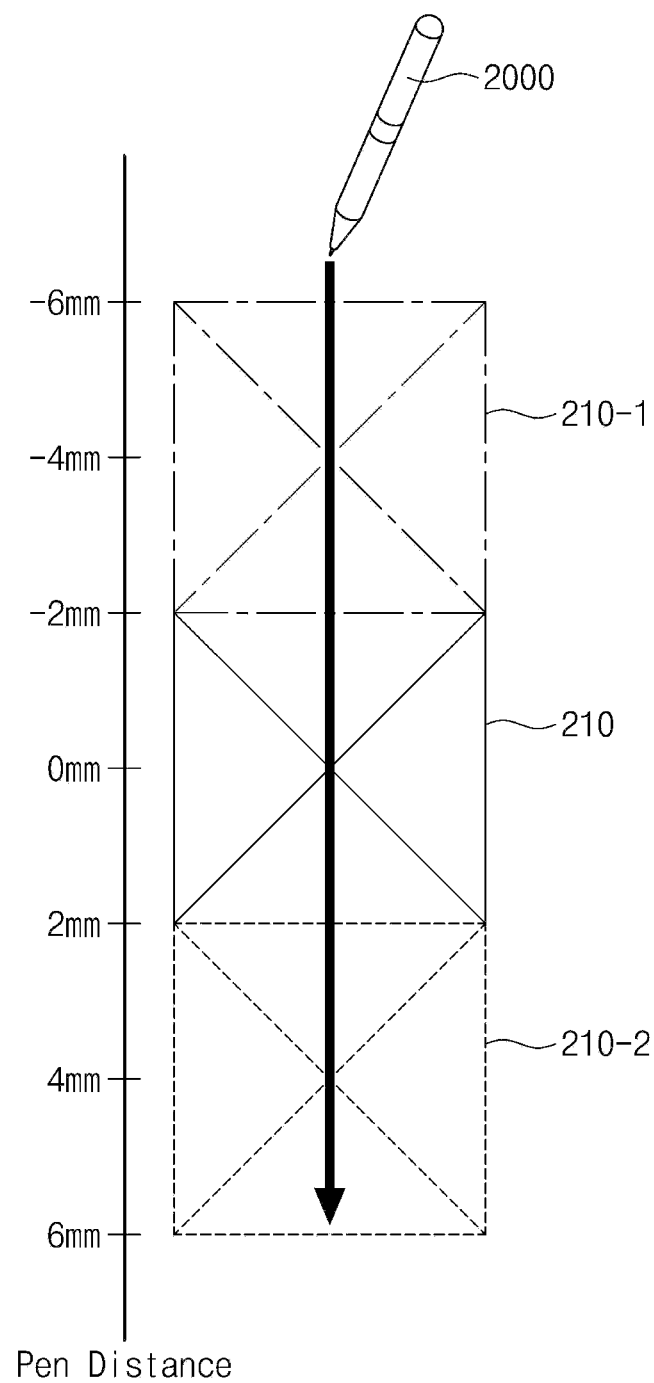
FIGS. 11A to 11C are graphs showing effects according to some embodiments.
Figure 11B:
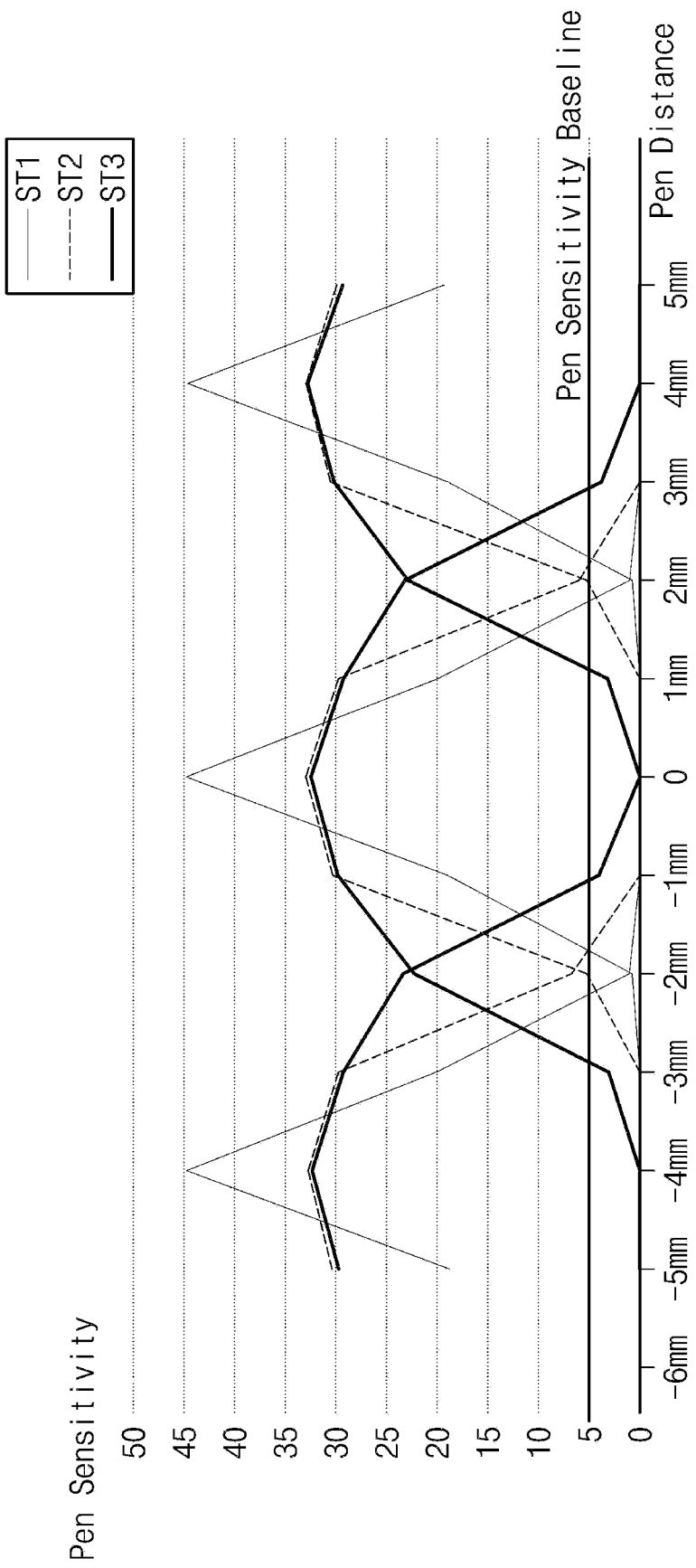
Figure 11C:
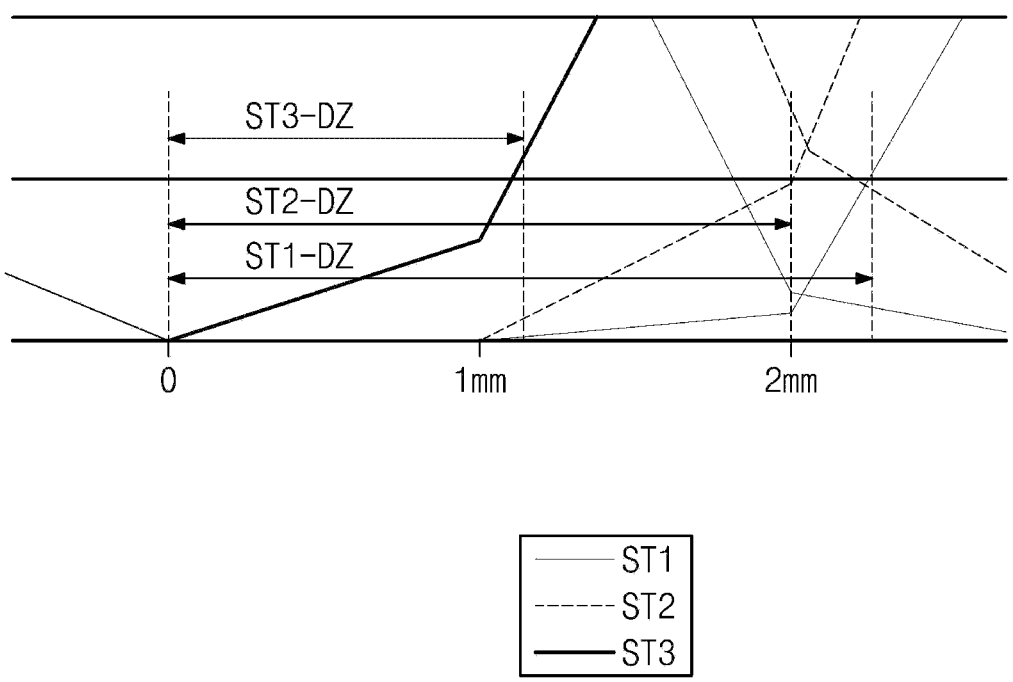

FIGS. 11A to 11C are graphs showing effects according to some embodiments of the present disclosure.

FIG. 11A illustrates that the input device 2000 according to some embodiments moves on a plurality of unit sensors adjacent to each other. In FIG. 11A, the input device 2000 may correspond to a pen including an active pen and an electronic pen. The pen may move by a distance of about −6 mm to about 6 mm. Here, a plurality of unit sensors 210-1, 210, and 210-2 are located within the distance of about −6 mm to about 6 mm. The pen may sequentially pass through the plurality of unit sensors 210-1, 210, and 210-2.

The pen may pass by a first unit sensor 210-1 in a first section of about −6 mm to about −2 mm, may pass by a second unit sensor 210 in a second section of about −2 mm to about 2 mm, and may pass by a third unit sensor 210-2 in a third section of about 2 mm to about 6 mm.

FIGS. 11B and 11C show the change in sensitivity of the pen at this time. That is, FIGS. 11B and 11C show whether the sensitivity of the pen, which is the input device 2000, may be continuously maintained while the pen passes by the unit sensors 210-1, 210, and 210-2 adjacent to each other.

First Comparative Example ST1 and Second Comparative Example ST2 show pen sensitivities according to a typical unit sensor structure. Example ST3 shows the pen sensitivity according to the unit sensor 210 (see FIG. 6A) of the input sensor 200 (see FIG. 3) according to some embodiments of the present disclosure.

In FIG. 11B, in all of First Comparative Example ST1, Second Comparative Example ST2, and Example ST3, the pen sensitivity of the first unit sensor 210-1 in the first section becomes maximum at −3 mm. In all of First Comparative Example ST1, Second Comparative Example ST2, and Example ST3, the pen sensitivity in the second section becomes maximum at 0 mm, and the pen sensitivity in the third section becomes maximum at 4 mm.

However, in the case of First Comparative Example ST1 and Second Comparative Example ST2, the pen sensitivity is not continuous between the first section and the second section and between the second section and the third section. However, in the case of Example ST3 of the inventive concept, when compared with the pen sensitivity of First Comparative Example ST1 and Second Comparative Example ST2, the pen sensitivity of Example ST3 continuously appears between the first section and the second section and also between the second section and the third section. When the pen sensitivity continuously appears between the first section and the second section and between the second section and the third section, the linearity of the input may be high or good. That is, some embodiments of the present disclosure include first and second additional electrodes between adjacent unit sensors to have high pen sensitivity even in a section between input sensors when the pen moves, and to increase input linearity.

A description will be given below with reference to FIGS. 11A, 11B and 11C. In FIGS. 11B and 11C, a pen sensitivity reference line may correspond to a minimum pen sensitivity for unit sensors to sense a pen. The pen sensitivity reference line corresponds to an arbitrary set value, and corresponds to 5 in FIGS. 11B and 11C, but is not necessarily limited thereto.

In the case of First Comparative Example ST1, in the first section, the first unit sensor 210-1 senses the pen at about −3 mm, and the sensitivity decreases to about −1 mm. Thereafter, in the second section, the second unit sensor 210 does not sense the pen from about −2 mm to about −1 mm, but senses the pen at about 0 mm. In the third section, it may be seen that the third unit sensor 210-2 does not sense the pen from about 0 mm to about 2.4 mm, but senses the pen at about 2.5 to about 4 mm. That is, in First Comparative Example ST1, the input sensor includes a first dead section ST1-DZ between the plurality of unit sensors 210-1, 210, and 210-2. For example, the first dead section ST1-DZ may correspond to a section from about 0 mm to about 2.4 mm between the second section and the third section. In this section, in First Comparative Example ST1, the sensitivity of the second unit sensor is decreased and the sensitivity of the third unit sensor is low, and thus the pen may not be sensed.

In the case of Second Comparative Example ST2, the first unit sensor 210-1 senses the pen at about −3 mm in the first section, and in the second section, the pen sensitivity decreases to about −1 mm, where the second unit sensor 210 starts to sense the pen, and thus the first unit sensor 210-1 does not sense the pen. The second unit sensor 210 senses the pen at about 0 mm, and the pen sensitivity decreases to about 2 mm, where the third unit sensor 210-2 starts to sense the pen, and thus second unit sensor 210 does not sense the pen. That is, a second dead section ST2-DZ may correspond to a section from about 0 mm to about 2 mm.

In the case of Example ST3 according to the present disclosure, the first unit sensor 210-1 senses a pen up to about −3 mm, and in the second section, the second unit sensor 210 senses a pen from about −2 mm to about 0 mm. In the second section, the pen sensitivity of the second unit sensor 210 decreases from about 0 mm. In the third section, the third unit sensor 210-2 starts to sense the pen from about 1 mm. That is, the third dead section ST3-DZ may correspond to about 1 mm from about 0 mm.

That is, the dead section of Example ST3 according to some embodiments of the present disclosure may be shorter than that of First and Second Comparative Examples ST1 and ST2. Accordingly, according to Example, the linearity of the input by the input device 2000 is high and the sensing reliability is improved.

When the pen sensitivity reference line corresponds to 5, the first to third dead sections ST1-DZ, ST2-DZ, and ST3-DZ are as described above. According to some embodiments, when there is no pen sensitivity reference line, in Example ST3 according to some embodiments of the present disclosure, the first unit sensor 210-1 of the first section senses the pen at about −3 mm, and then the second unit sensor 210 starts immediately sensing the pen from about −3 mm in the second section. In the second section, the second unit sensor 210 senses the pen at about 0 mm, and then in the third section, the third unit sensor 210-2 starts immediately sensing the pen from about 0 mm. Accordingly, when there is no pen sensitivity reference line, a dead section does not exist in Example ST3 according to some embodiments of the present disclosure, and an input by the input device 2000 may appear continuously and linearly.

According to some embodiments of the present disclosure, an electronic device may increase the linearity of a pen input and improve a sensing reliability by extending a sensing electrode of a unit sensor of an input sensor to an adjacent unit sensor.

The embodiments have been described in the drawings and the specification. While specific terms were used, they were not used to limit the meaning or the scope of embodiments according to the present disclosure described in the claims but merely used to explain aspects of some embodiments of the present disclosure. Accordingly, those skilled in the art will understand that various modifications and other equivalent embodiments are also possible. Hence, the scope of embodiments according to the present disclosure shall be determined by the technical scope of the accompanying the claims, and their equivalents.

What is claimed is:

1. An electronic device comprising:
 a display panel; and
 an input sensor on the display panel and including a plurality of unit sensors each having a first unit sensor, a second unit sensor adjacent to the first unit sensor in a first direction, and a third unit sensor adjacent to the first unit sensor in a second direction crossing the first direction,
 wherein each of the first, second, and third unit sensors includes:
 a first sensing electrode extending in the first direction;
 a second sensing electrode extending in the second direction; and
 a first dummy electrode between the first sensing electrode and the second sensing electrode,
 wherein the first sensing electrode of the first unit sensor is connected to a first adjacent dummy electrode of the first dummy electrodes of the third unit sensor adjacent to the first unit sensor, and
 wherein the second sensing electrode of the first unit sensor is connected to a first adjacent dummy electrode of the first dummy electrodes of the second unit sensor adjacent to the first unit sensor.

2. The electronic device of claim 1, wherein the first sensing electrode comprises a first sensing unit and a first connection unit, the second sensing electrode comprises a second sensing unit and a second connection unit, the first connection unit connects first sensing units adjacent thereto to each other, and the second connection unit connects second sensing units adjacent thereto to each other.

3. The electronic device of claim 2, wherein the first sensing unit, the second sensing unit, and the first connection unit are on a same layer, and
 the second connection unit comprises a first bridge pattern and is on a layer different from a layer on which the first sensing unit, the second sensing unit, and the first connection unit are located.

4. The electronic device of claim 3, wherein each of the first sensing electrode and the second sensing electrode and the first adjacent dummy electrode are connected through a second bridge pattern, and
the second bridge pattern and the first bridge pattern are on the same layer.

5. The electronic device of claim 4, wherein an opening is defined in each of the first sensing unit and the second sensing unit, and each of the plurality of unit sensors further comprises a second dummy electrode that is floating and in the opening.

6. The electronic device of claim 5, wherein the first sensing electrode of the first unit sensor is connected to a second adjacent dummy electrode of the second dummy electrodes of the third unit sensor adjacent to the first unit sensor, and
the second sensing electrode of the first unit sensor is connected to a second adjacent dummy electrode of the second dummy electrodes of the second unit sensor adjacent to the first unit sensor.

7. The electronic device of claim 6, wherein the second adjacent dummy electrode is connected to the first adjacent dummy electrode, and the first sensing electrode and the second sensing electrode are electrically connected to the second adjacent dummy electrode through the first adjacent dummy electrode.

8. The electronic device of claim 7, wherein the first adjacent dummy electrode and the second adjacent dummy electrode are connected through a third bridge pattern, and the third bridge pattern is on a same layer as a layer on which the first bridge pattern and the second bridge pattern are located.

9. The electronic device of claim 4, wherein the first sensing electrode comprises a first connection pattern to which the second bridge pattern is directly connected, and the second sensing electrode comprises a second connection pattern to which the second bridge pattern is directly connected.

10. The electronic device of claim 1, further comprising an encapsulation layer on the display panel, wherein the input sensor is directly on the encapsulation layer.

11. The electronic device of claim 1, wherein the input sensor comprises:
an active region; and
a peripheral region adjacent to the active region,
the active region includes a plurality of unit sensor regions, and the plurality of unit sensors are in the plurality of unit sensor regions.

12. The electronic device of claim 11, wherein the plurality of unit sensor regions comprise a first unit sensor region in which the first unit sensor is located, a second unit sensor region in which the second unit sensor is located, and a third unit sensor region in which the third unit sensor is located.

13. The electronic device of claim 12, wherein the plurality of unit sensor regions further comprise a first region in which a portion of the first unit sensor and a portion of the second unit sensor are located and a second region in which a portion of the first unit sensor and a portion of the third unit sensor are located.

14. An electronic device comprising:
a display panel; and
an input sensor on the display panel and including a plurality of unit sensors,
wherein each of the plurality of unit sensors includes:
a first sensing electrode extending in a first direction;
a second sensing electrode extending in a second direction crossing the first direction;
a first additional sensing electrode electrically connected to the first sensing electrode; and
a second additional sensing electrode electrically connected to the second sensing electrode,
the first sensing electrode and the second sensing electrode are in a first unit sensor region,
the second additional sensing electrode is in the first unit sensor region and in a second unit sensor region adjacent to the first unit sensor region in the first direction, and
the first additional sensing electrode is in the first unit sensor region and in a third unit sensor region adjacent to the first unit sensor region in the second direction.

15. The electronic device of claim 14, wherein each of the plurality of unit sensors further comprises a first bridge pattern, and the first bridge pattern connects the first sensing electrode and the first additional sensing electrode, and connects the second sensing electrode and the second additional sensing electrode.

16. The electronic device of claim 15, wherein the first bridge pattern is on a layer different from a layer on which the first sensing electrode, the first additional sensing electrode, the second sensing electrode, and the second additional sensing electrode are located.

17. The electronic device of claim 16, wherein one of the first sensing electrode and the second sensing electrode comprises a second bridge pattern, and the first bridge pattern and the second bridge pattern are on the same layer.

18. The electronic device of claim 14, wherein the plurality of unit sensors comprise a first unit sensor in the first unit sensor region, a second unit sensor in the second unit sensor region, and a third unit sensor in the third unit sensor region.

19. The electronic device of claim 18, wherein in the first unit sensor region, a first region overlapping the second unit sensor region and a second region overlapping the third unit sensor region are defined,
the second additional electrode of the first unit sensor and a second additional electrode of the second unit sensor are in the first region, and
the first additional electrode of the first unit sensor and a first additional electrode of the third unit sensor are in the second region.

20. The electronic device of claim 14, wherein each of the plurality of unit sensors comprises a plurality of openings defined in each of the first sensing electrode and the second sensing electrode, and the first additional sensing electrode and the second additional sensing electrode of another unit sensor adjacent thereto are in some of the openings.

* * * * *